United States Patent
Fly et al.

(10) Patent No.: US 9,352,905 B2
(45) Date of Patent: May 31, 2016

(54) BATTERY MONITORING IN A NETWORKED INVENTORY CONTROL SYSTEM

(71) Applicant: SNAP-ON INCORPORATED, Kenosha, WI (US)

(72) Inventors: David C. Fly, Maumelle, AR (US); Preston C. Phillips, Conway, AR (US); Matthew J. Lipsey, Sherwood, AR (US); Joseph Chwan, Mechanicsburg, PA (US); Jason Newport, Conway, AR (US); Frederick J. Roger, North Little Rock, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 58 days.

(21) Appl. No.: 14/282,914

(22) Filed: May 20, 2014

(65) Prior Publication Data

US 2014/0350716 A1    Nov. 27, 2014

Related U.S. Application Data

(60) Provisional application No. 61/825,932, filed on May 21, 2013.

(51) Int. Cl.
  *G06F 7/00* (2006.01)
  *B65G 1/02* (2006.01)
  *G06F 1/32* (2006.01)

(52) U.S. Cl.
  CPC .............. *B65G 1/02* (2013.01); *G06F 1/3212* (2013.01); *Y02B 60/1292* (2013.01)

(58) Field of Classification Search
  CPC ...... B65G 1/02; G08B 21/182; G08B 21/185; G01R 31/36
  USPC ......... 700/214, 215, 286, 291, 297; 340/636.1; 324/426, 427, 750.15
  See application file for complete search history.

(56) References Cited

U.S. PATENT DOCUMENTS

| 7,646,172 B2 * | 1/2010 | Jones ................. H02J 7/0022 320/132 |
| 8,353,456 B2 | 1/2013 | Jackson et al. |

(Continued)

FOREIGN PATENT DOCUMENTS

| EP | 8-251714 A | 9/1996 | |
| EP | 08251714 A * | 9/1996 | .............. B60L 11/18 |
| EP | 0895151 A1 | 2/1999 | |
| GB | 2341258 A | 3/2000 | |
| WO | 2012061262 A1 | 5/2012 | |

OTHER PUBLICATIONS

OpenUPS2 11-24V Intelligent DC-DC Uninterruptible Power Supply product information sheet, retrieved from: http://www.mini-box.com/OpenUPS2 Downloaded May 20, 2014, 2 pages.

(Continued)

*Primary Examiner* — Mark Beauchaine
(74) *Attorney, Agent, or Firm* — McDermott Will & Emery LLP

(57) ABSTRACT

An inventory control device, such as an electronic toolbox, monitors the identity of battery packs that are mounted in the device and used to provide electrical power to the device. The device retrieves a unique identifier for each battery pack, and monitors the operation of each battery pack. The monitored data can be logged into memory for future use, communicated to a user of the inventory control device, and/or used to predict the future performance or replacement date for a battery pack. The monitored data can also be communicated across a communication network to an inventory control server that monitors the operation and performance of battery packs throughout an electronic tools control system including multiple toolboxes. The server can further track the operation and locations of battery packs through all of the toolboxes.

23 Claims, 16 Drawing Sheets

(56) References Cited

U.S. PATENT DOCUMENTS

| | | |
|---|---|---|
| 2009/0066291 A1 | 3/2009 | Tien et al. |
| 2010/0121482 A1* | 5/2010 | Jackson ............... G06Q 10/087 700/217 |
| 2012/0079859 A1* | 4/2012 | Lakamraju .......... E05B 17/0075 70/277 |
| 2012/0182132 A1* | 7/2012 | McShane ............ H01M 10/486 340/10.51 |
| 2012/0319694 A1* | 12/2012 | Thorvinger ............... G06F 1/30 324/427 |

OTHER PUBLICATIONS 11-24V Intelligent DC-DC Uninterruptible Power Supply manual, retrieved from:http://wiki.mini-box.com/indexphp?title=OpenUPS2 Downloaded May 20, 2014, 18 pages.

International Search Report PCT/US2014/038843 dated Oct. 9, 2014, (13 pages).

\* cited by examiner

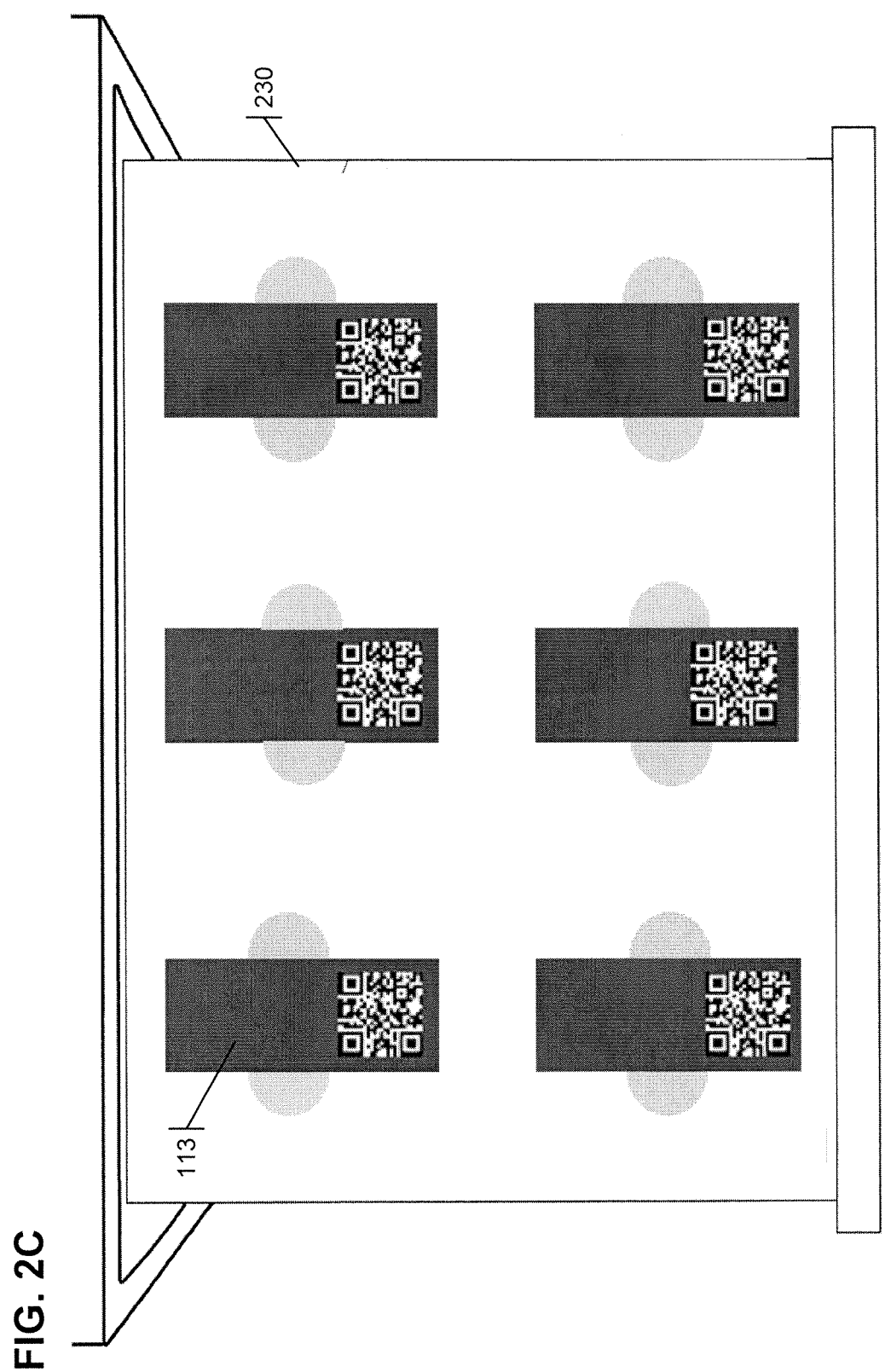

FIG. 5D

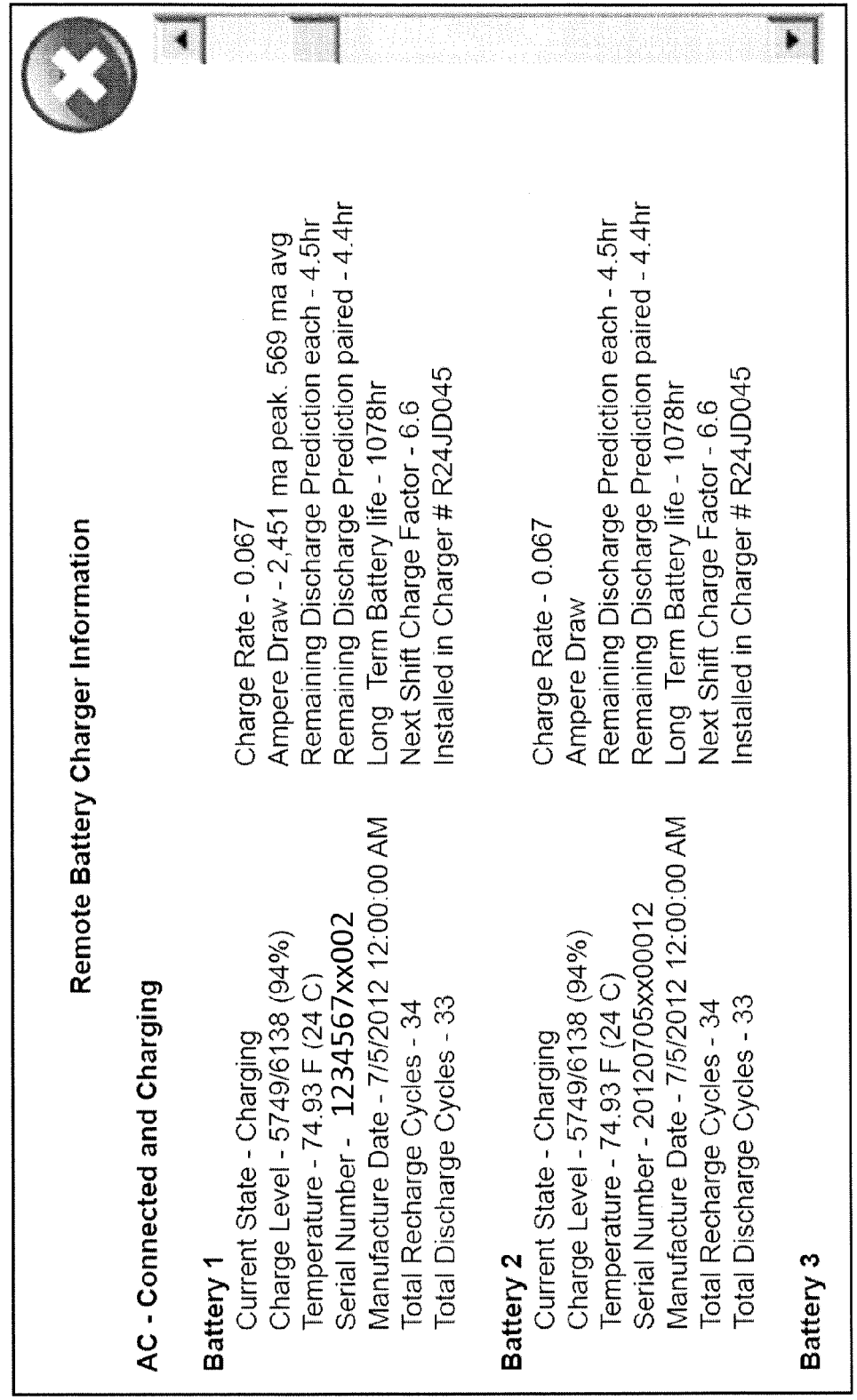

Remote Battery Charger Information

AC - Connected and Charging

Battery 1
Current State - Charging
Charge Level - 5749/6138 (94%)
Temperature - 74.93 F (24 C)
Serial Number - 1234567xx002
Manufacture Date - 7/5/2012 12:00:00 AM
Total Recharge Cycles - 34
Total Discharge Cycles - 33

Charge Rate - 0.067
Ampere Draw - 2,451 ma peak. 569 ma avg
Remaining Discharge Prediction each - 4.5hr
Remaining Discharge Prediction paired - 4.4hr
Long Term Battery life - 1078hr
Next Shift Charge Factor - 6.6
Installed in Charger # R24JD045

Battery 2
Current State - Charging
Charge Level - 5749/6138 (94%)
Temperature - 74.93 F (24 C)
Serial Number - 20120705xx00012
Manufacture Date - 7/5/2012 12:00:00 AM
Total Recharge Cycles - 34
Total Discharge Cycles - 33

Charge Rate - 0.067
Ampere Draw
Remaining Discharge Prediction each - 4.5hr
Remaining Discharge Prediction paired - 4.4hr
Long Term Battery life - 1078hr
Next Shift Charge Factor - 6.6
Installed in Charger # R24JD045

Battery 3

FIG. 5I

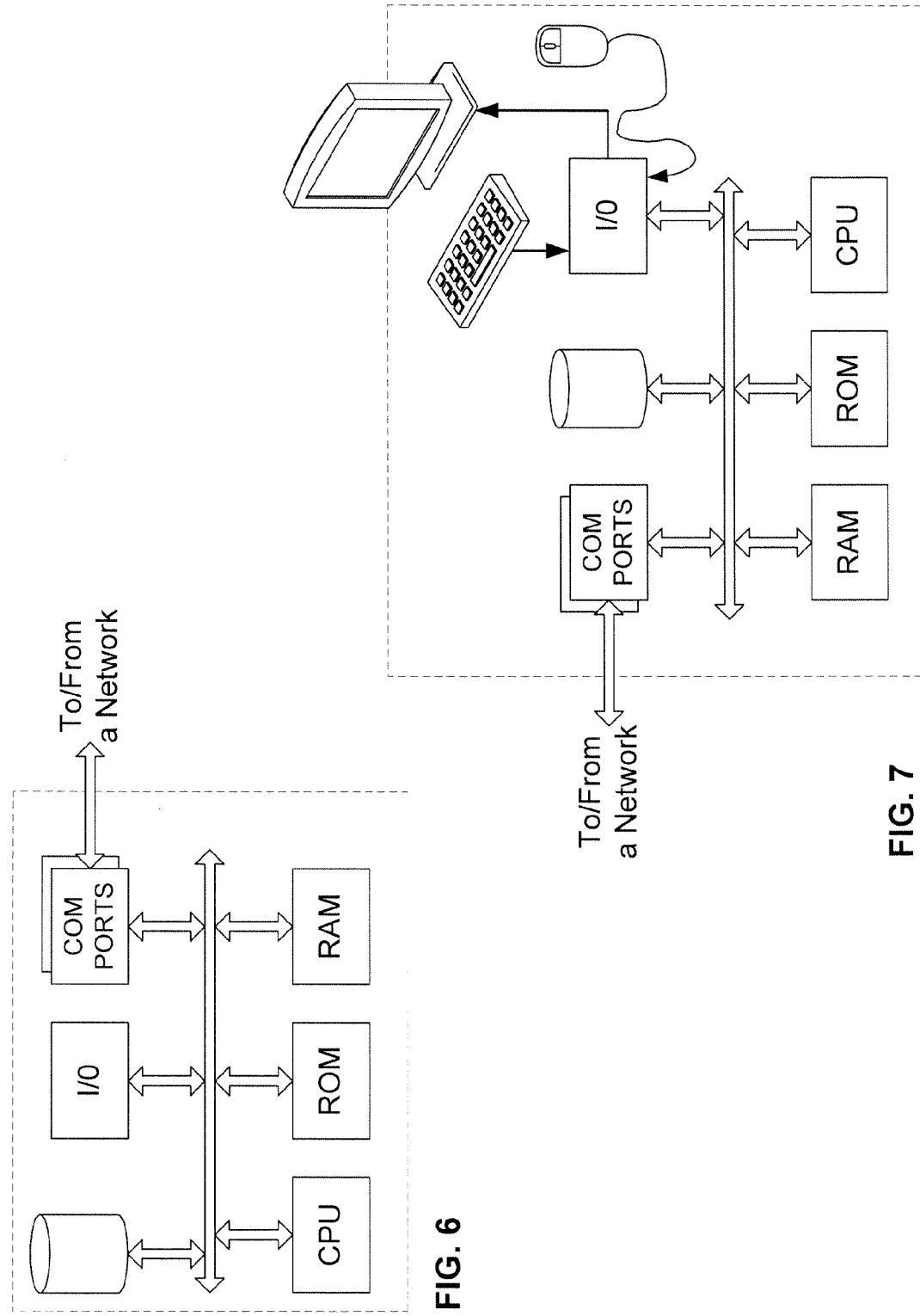

BATTERY MONITORING IN A NETWORKED INVENTORY CONTROL SYSTEM

CROSS-REFERENCE TO RELATED APPLICATION

This application claims the benefit of U.S. Provisional Application No. 61/825,932, filed on May 21, 2013, the disclosure of which is incorporated herein in its entirety.

TECHNICAL FIELD

The present subject matter relates to battery monitoring systems and methods in networked inventory control systems. The present subject matter has particular applicability to automated tool control systems having on-board power sources such as batteries.

BACKGROUND

When tools are used in a manufacturing or service environment, it is important that tools be returned to a storage unit, such as a tool box, after use. Employers regularly perform manual inventory checks of tool boxes to minimize or eliminate problems related to the misplacement or theft of expensive tools. In some companies, random audits of employees' toolboxes are conducted to prevent theft and monitor tool location.

Some industries have high standards for inventory control of tools, for example to prevent incidents of leaving tools in the workplace environment where they could cause severe damage. In the aerospace industry, for example, it is important to ensure that no tools are accidentally left behind in an aircraft or missile being manufactured, assembled, or repaired. The Aerospace Industries Association has even established a standard called the National Aerospace Standard that includes recommended procedures, personnel management, and operations to reduce foreign object damage (FOD) resulting from tools left behind in aerospace products. FOD can result from any object not structurally part of the aircraft. The most common objects causing FOD are nuts, bolts, safety wire, and hand tools. Stringent inventory control of tools is critical to preventing tools from being left in an aircraft, and can advantageously reduce the occurrence of FOD.

Toolboxes can include built-in inventory determination features to track inventory conditions of tools stored in the toolboxes. For example, some toolboxes have contact sensors, magnetic sensors, or infrared sensors in or next to each tool storage location to detect whether a tool is present in the tool storage location. Based on signals generated by the sensors, the toolboxes determine whether any tools are missing.

Other systems, known as image-based inventory control systems, use image sensors for monitoring the removal and replacement of objects, such as tools, from a toolbox drawer, and for identifying objects removed from and returned to the system. An exemplary system, described in U.S. Pat. No. 8,353,456, whose disclosure is hereby incorporated by reference in its entirety, includes a movable storage drawer having storage locations for the objects, and an image sensing device (such as a camera) for imaging the storage locations while the drawer is being closed. A data processor receives the imaging information and determines therefrom whether or not the objects are in the drawer.

Conventionally, A/C power is used to power the operation of automated tool control systems, for example by providing A/C power to a personal computer that is part of the toolbox. Some systems include rechargeable batteries. However, in these systems, a user is typically only able to determine whether a battery is installed or missing, the battery's charge level, and/or the battery's charging mode. There exists a need for a more sophisticated battery monitor and control system to provide more information and functionality to the user.

SUMMARY

The teachings herein alleviate one or more of the above noted problems with an inventory control device, a processor and sensing device, a power source, and a power source controller. The inventory control device includes a plurality of storage locations configured to store inventory items. The processor and sensing device determine the presence or absence of inventory items in the plurality of storage locations. The power source includes at least one battery pack operative to provide electrical power to the processor and the sensing device. The power source controller controls the power source to provide the electrical power to the processor and the sensing device. The power source controller is further configured to perform functions to retrieve, from each of the at least one battery pack, an identifier uniquely identifying the battery pack, to monitor the operation of each of the at least one battery pack, and to store in memory data indicative of the monitored operation of each of the at least one battery pack in association with the retrieved unique identifier for the battery pack.

The inventory control device can include at least one battery pack that includes rechargeable batteries.

The inventory control device can include a display screen configured to display information to a user of the inventory control device. The processor of the inventory control device can be configured to perform functions to receive, from the power source controller, the data indicative of the monitored operation of each of the at least one battery pack, and to generate, for display on the display screen based on the data received from the power source controller, information on the operation of the at least one battery pack.

The processor of the inventory control device can generate, for display on the display screen based on the data received from the power source controller, battery pack status alerts.

The inventory control device can further include a user input interface for receiving input from the user of the inventory control device. The processor of the inventory control device can be configured to perform functions to receive, from the user input interface, a user selection for changing a battery pack that is currently providing the electrical power to the processor and the sensing device, and to control the power source controller to cause the power source controller to change the battery pack that is currently providing the electrical power to the processor and the sensing device in accordance with the received user selection.

The inventory control device can further include a network communication interface configured for data communication across a communication interwork. The processor of the inventory control device can be configured to perform functions to receive, from the power source controller, the data indicative of the monitored operation of each of the at least one battery pack, and to transmit, across the communication network via the network communication interface, the received data indicative of the monitored operation of the at least one battery pack.

The processor of the inventory control device can be configured to perform functions to receive, from the communication network via the network communication interface, a command for changing a battery pack that is currently providing the electrical power to the processor and the sensing device, and to control the power source controller to cause the power source controller to change the battery pack that is currently providing the electrical power to the processor and the sensing device in accordance with the command received from the communication network.

The power source can include a plurality of battery packs, and the power source controller can be configured to perform functions to control the power source to cause the power source to provide the electrical power to the processor and the sensing device from only one or more selected battery packs of the plurality of battery packs.

The power source controller can be configured to perform functions to determine a remaining electrical power level in each of the plurality of battery packs, to identify, among the plurality of battery packs, one or more battery packs having remaining electrical power levels that exceed a minimum remaining electrical power level threshold, and to provide the electrical power to the processor and the sensing device from one battery pack of the plurality of battery packs that is determined to have the lowest remaining electrical power level among the battery packs identified as having remaining electrical power levels exceeding the minimum remaining electrical power level threshold.

The power source controller may be further configured to perform functions to monitor the remaining electrical power level of the one battery pack while the one battery pack provides the electrical power to the processor and the sensing device; to, upon determining that the remaining electrical power level of the one battery pack has fallen below the minimum remaining electrical power level threshold, identify one or more other battery packs having remaining electrical power levels that exceed the minimum remaining electrical power level threshold; and to provide the electrical power to the processor and the sensing device from a battery pack that is determined to have the lowest remaining electrical power level among the one or more other battery packs identified as having remaining electrical power levels exceeding the minimum remaining electrical power level threshold.

The power source controller can be configured to perform functions to determine a remaining electrical power level in each of the at least one battery packs, to determine that the remaining electrical power levels of each of the at least one battery pack does not exceed a minimum remaining electrical power level threshold, and to cause the inventory control device to shut down upon determining that the remaining electrical power level of each of the at least one battery pack does not exceed the minimum remaining electrical power level threshold.

The inventory control device can further include a battery lock configured to prevent removal of the at least one battery pack when the battery lock is engaged, and an access control device configured to control the battery lock to engage or dis-engage the battery lock based on battery lock commands received from at least one of the power source controller and the processor.

The power source controller can be further configured to maintain a database of historical battery pack information storing, for each retrieved battery pack identifier, the data indicative of the monitored operation of the battery pack in association with the unique identifier for the battery pack, and to compute, based on the historical battery pack information associated with an identifier for a particular battery pack, a predicted remaining discharge time for the particular battery pack.

According to a further aspect of the disclosure, an electronic inventory control system includes a data communication network, a plurality of inventory control devices, and an inventory control server. The plurality of inventory control devices are communicatively connected to the data communication network, and each inventory control device includes a plurality of storage locations configured to store inventory items, a processor and sensing device configured to determine the presence or absence of inventory items in the plurality of storage locations, a power source including at least one battery pack operative to provide electrical power to the processor and the sensing device, and a network communication interface for communicating across the data communication network. The inventory control server is communicatively connected to the data communication network to communicate with each of the plurality of inventory control devices. The inventory control server is configured to perform functions to receive, via the data communication network from each of the inventory control devices, battery pack information including data indicative of monitored operation of a battery pack in the inventory control device in association with an identifier uniquely identifying the battery pack.

The inventory control server can be further configured to generate, based on the battery pack information received from each of the inventory control devices, a battery pack status alert identifying a battery pack that is a subject of the alert and identifying an inventory control device of the plurality of inventory control devices including the battery pack that is the subject of the alert, and to cause the battery pack status alert to be issued in the form of at least one of a display on a computer terminal of the inventory control server and an alert issued in the form of a messaging service message or an email message.

The inventory control server can store, in a database of historical battery pack information, the received battery pack information including the data indicative of the monitored operation of a battery pack in association with an identifier uniquely identifying the battery pack, and the inventory control server can be configured to compute, based on the historical battery pack information stored in the database and associated with a particular battery pack identifier, a predicted remaining discharge time for the battery pack identified by the particular battery pack identifier.

The inventory control server can be further configured to compute, based on the historical battery pack information stored in the database and associated with the particular battery pack identifier, a battery lifetime or replacement date for the battery pack identified by the particular battery pack identifier.

The electronic inventory control system can further include a battery pack charger communicatively connected to the data communication network. The inventory control server can be configured to perform functions to receive, via the data communication network from the battery pack charger, battery pack information including data indicative of monitored charging operation of a battery pack in the battery pack charger in association with an identifier uniquely identifying the battery pack, and to determine, based on the battery pack information received from the plurality of inventory control devices and from the battery pack charger, the location and remaining electrical power levels of the battery packs.

The inventory control server can be configured to perform functions to compute, based on the battery pack information received from each of the inventory control devices and from the battery pack charger, a predicted remaining electrical power level of each battery pack at a predetermined future time.

The inventory control server can be configured to generate and transmit, to a particular inventory control device across the data communication network, a command for causing the power source of the particular inventory control device to change a battery pack that is currently providing the electrical power to the processor and the sensing device of the inventory control device.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 2A-2C are drawings of an illustrative inventory control device implemented as a tool storage device, and the inside of drawers of the inventory control device.

FIGS. 5A-5I are screen-shots of display screens that may be provided on an inventory control device, a computer terminal, or another networked device to provide battery-related information in accordance with the methods for monitoring of battery packs described herein.

FIG. 6 is a simplified functional block diagram of a computer that may be configured as a host or server, for example, to function as the inventory control server in the system of FIG. 1.

FIG. 7 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to the monitoring of batteries in networked inventory control systems such as networked tool control systems.

The systems and methods enable an inventory control device, such as a toolbox, to monitor the identity of battery packs that are mounted in the device and used to provide electrical power to the device. In addition to retrieving identifiers uniquely identifying each battery pack mounted in the inventory device, the systems and method enable the inventory control device to monitor the operation of each battery packs, and to maintain a log in memory storing data on the operation of each of the plurality of battery packs. The stored data can be communicated to a user of the inventory control device, for example to enable the user to manage the use of the battery packs, to select a particular battery pack to provide the electrical power to the inventory control device, and/or to remove or replace a battery pack in the inventory control device. The stored data can further be used to predict the future performance of a battery pack, for example to estimate the amount of electrical power remaining in a battery pack and/or determine whether a battery pack should be replaced or retired from use. The battery operation data can also be communicated across a communication network to a battery monitor used to monitor the operation and performance of battery packs throughout an electronic tools control system including multiple toolboxes.

Reference now is made in detail to the examples illustrated in the accompanying drawings and discussed below.

Figure 1:
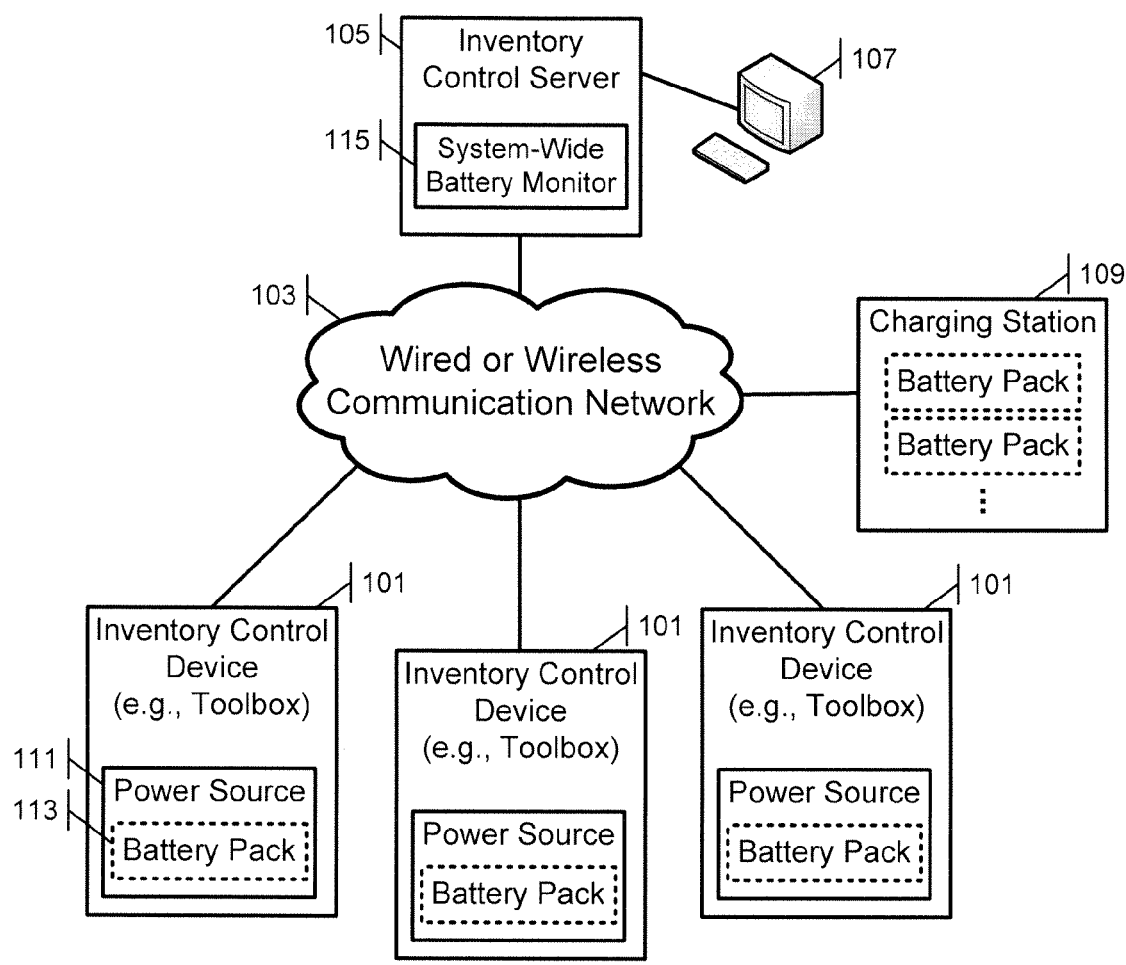
FIG. 1 is a high-level functional block diagram of an electronic tool control system (ETCS) including a plurality of networked inventory control devices, such as tool control devices including toolboxes, connected to provide networked battery monitoring services.

FIG. 1 shows an exemplary electronic tool control system (ETCS) 100 including a plurality of inventory control devices 101, such as tool control devices including toolboxes. Each inventory control device 101 is configured to store a plurality of items, and to monitor the inventory of items currently stored in (and therefore present in) device 101 and/or items missing from (and therefore absent from) storage in the device 101. The inventory control devices 101 are communicatively coupled to and configured for communication across a wired or wireless communication network 103. Network 103 can correspond to a single network such as a Wi-Fi or wired local area network (LAN) spanning a repair facility, or correspond to an interconnection of multiple networks spanning one or more repair facilities, such as Wi-Fi and/or wired networks interconnected together via a wide area network (WAN) and/or the Internet. In some examples, the network 103 can further connect to a mobile wireless communication network, for example to enable an inventory control device 101 to communicate with the ETCS 100 anywhere within a coverage area of the mobile wireless communication network and/or to enable inventory-related notices and alerts to be communicated to users across the mobile wireless communication network (e.g., as text messages or other messaging service messages, as emails, or the like).

The inventory control devices 101 communicate across the network 103 with an inventory control server 105. The inventory control server 105 can receive information from each inventory control device 101 on the status of items present in or missing from the device 101, and provide information on the status of inventory items in all inventory control devices 101 of the ETCS 100. The inventory control server 105 can additionally provide to each inventory control device 101 inventory information on items designated for storage in the inventory control device 101, and the inventory control device 101 can use the inventory information to determine whether the inventory items identified in the inventory information are currently stored in or missing from the device 101. The inventory control server 105 can include a computer terminal 107 enabling a manager of the ETCS 100 to access information on the status of inventory items in each of the inventory control devices 101 of the ETCS 100, and to create or update inventory information for each of the inventory control devices 101.

Each inventory control device 101 includes a power source 111 configured to provide electrical power to power the operation of electrical systems of the inventory control device 101. In some examples, an inventory control device 101 is configured to be plugged into to an electrical outlet via an electric cable, and the power source 111 is configured to receive power via the electric cable from the electric power grid. In such examples, the power source 111 can include a transformer and/or a rectifier, and can be configured to convert alternating current (AC) power received from the electric power grid into power useable by the electrical systems of the inventory control device 101 (e.g., to convert 120 Volt AC power into 12 V direct current (DC) power).

In addition, as shown in FIG. 1, the power source 111 can include one or more battery pack(s) 113. The battery pack(s) 113 are used to power the electrical systems of the inventory control device 101. The battery pack(s) 113 can notably be used to power the inventory control device 101 when power is not received from the electric power grid, such as when the power source 111 is not connected to the electric power grid. In general, the battery pack(s) 113 directly provide power useable by the electrical systems of the inventory control device 110 (e.g., 12 V DC power) at their outputs. A power source 111 can include multiple battery packs 113 in order to extend the amount of power stored by the power source 111 and available for use by the inventory control device 101, and thereby extend a period of time during which the inventory control device 101 can be used without being connected to the electric power grid. The power source 111 can additionally include multiple removable battery packs 113 in order to enable the inventory control device 101 to be powered by one battery pack 113 while the other battery pack(s) 113 (e.g., discharged battery packs) are removed and replaced (e.g., with fully charged battery packs).

Each battery pack 113 stores a limited amount of electrical power, and can only power the inventory control device 101 while sufficient power remains in the battery pack 113. In order to maintain sufficient power in a battery pack 113, the battery pack 113 needs to be recharged with electrical power when it becomes depleted of electrical power. In some examples, the power source 111 is configured to recharge any battery pack(s) 113 present therein when the power source 111 receives electrical power from the electric power grid. Additionally or alternatively, in implementations in which the battery packs 113 can be removed from the inventory control devices 101, the ETCS 100 can include one or more charging station(s) 109. The charging station 109 receives power from the electric power grid, and can charge battery packs 113 mounted therein.

In addition to communicating information on the status of an item present in (or missing/absent from) an inventory control device, the inventory control devices 101 are configured to communicate battery-related information across the network 103 to the inventory control server 105. The charging station 109 can similarly communicate battery-related information to the inventory control server 105. For these purposes, the inventory control server 105 includes a system-wide battery monitor 115 operative to monitor the status of battery packs throughout the ETCS 100. The battery monitor 115 receives battery pack-related information from each inventory control device 101, including information on the identity and status of battery packs currently mounted in the device 101. The battery monitor 115 can additionally provide battery pack-related commands to an inventory control device 101, for example to cause the device 101 to begin charging of a particular battery pack 113, to interrupt or end charging of a battery pack 113, or the like. The battery monitor 115 can further store battery pack-related information, such as data on the performance of different battery packs over time. In examples in which a charging station 109 is used, the charging station 109 is configured to communicate across the network 103 with the battery monitor 115 of the inventory control server 105, so as to communicate battery-related information relating to battery packs mounted therein. The charging station 109 can further receive and act on battery pack-related commands received from the system-wide battery monitor 115. A manager of the ETCS 100 can access battery-pack related information from the battery monitor 115 via the computer terminal 107, and control the charging and discharging of battery packs throughout the system 100 via the computer terminal 107.

Figure 2A:
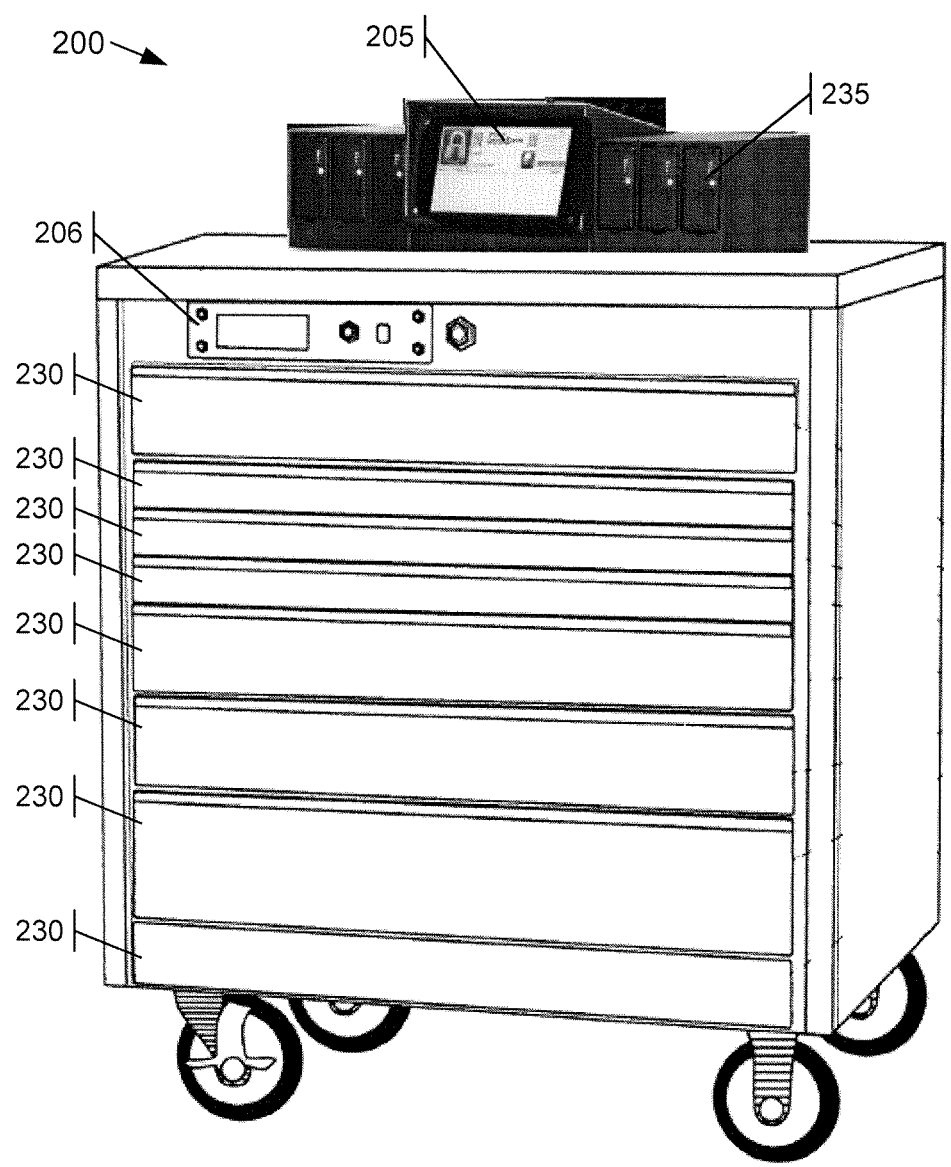

FIG. 2A shows an exemplary inventory control device 101 implemented as a tool storage device 200 according to this disclosure for storing tools. Storage device 200 includes a display screen 205, an access control device 206, such as a card reader, for verifying identity and authorization levels of a user intending to access storage device 200, and multiple tool storage drawers 230 for storing tools. The storage device 200 further includes a battery mount 235 in which one or more battery pack(s) 113 can be mounted so as to power to the device 200. The battery mount 235 can be located in different locations on the storage device 200, including on an upper surface of the storage device 200 (as shown) or within a drawer or other compartment of the storage device 200. The storage device 200 can further include a user input interface, which can take the form of a touch-screen interface enabling a user to provide input commands via display screen 205, or the form of a keyboard, a track-pad, a motion sensor, a tablet, or the like.

Tool storage device 200 includes a sensing device configured to determine the inventory status of tools and/or corresponding storage locations. The sensing device may be an image sensing device configured to capture images of contents or storage locations of the device 200, such as one or more lens-based cameras, CCD cameras, CMOS cameras, video cameras, or any type of device that captures images. The sensing device can additionally or alternatively determine the inventory status of tools based on other sensing technologies such as radio frequency (RF) (e.g., RF identification (RFID) technology), ultrasonics, contact or weight sensors, or the like. Device 200 includes a data processing system, such as a computer or processor, for processing sensing data captured by the sensing device. Data captured by the sensing device, such as images captured or formed by the image sensing device, are processed by the data processing system to determine an inventory condition of the system and/or of each storage drawer. The term inventory condition as used throughout this disclosure means information relating to a presence or absence condition of an object.

The data processing system may be part of tool storage device 200. In one embodiment, the data processing system is a remote computer having a data link, such as a wired or wireless link, coupled to tool storage device 200; or a combination of a computer integrated in storage device 200 and a computer remote to storage device 200 (e.g., inventory control server 105).

Figure 2B:
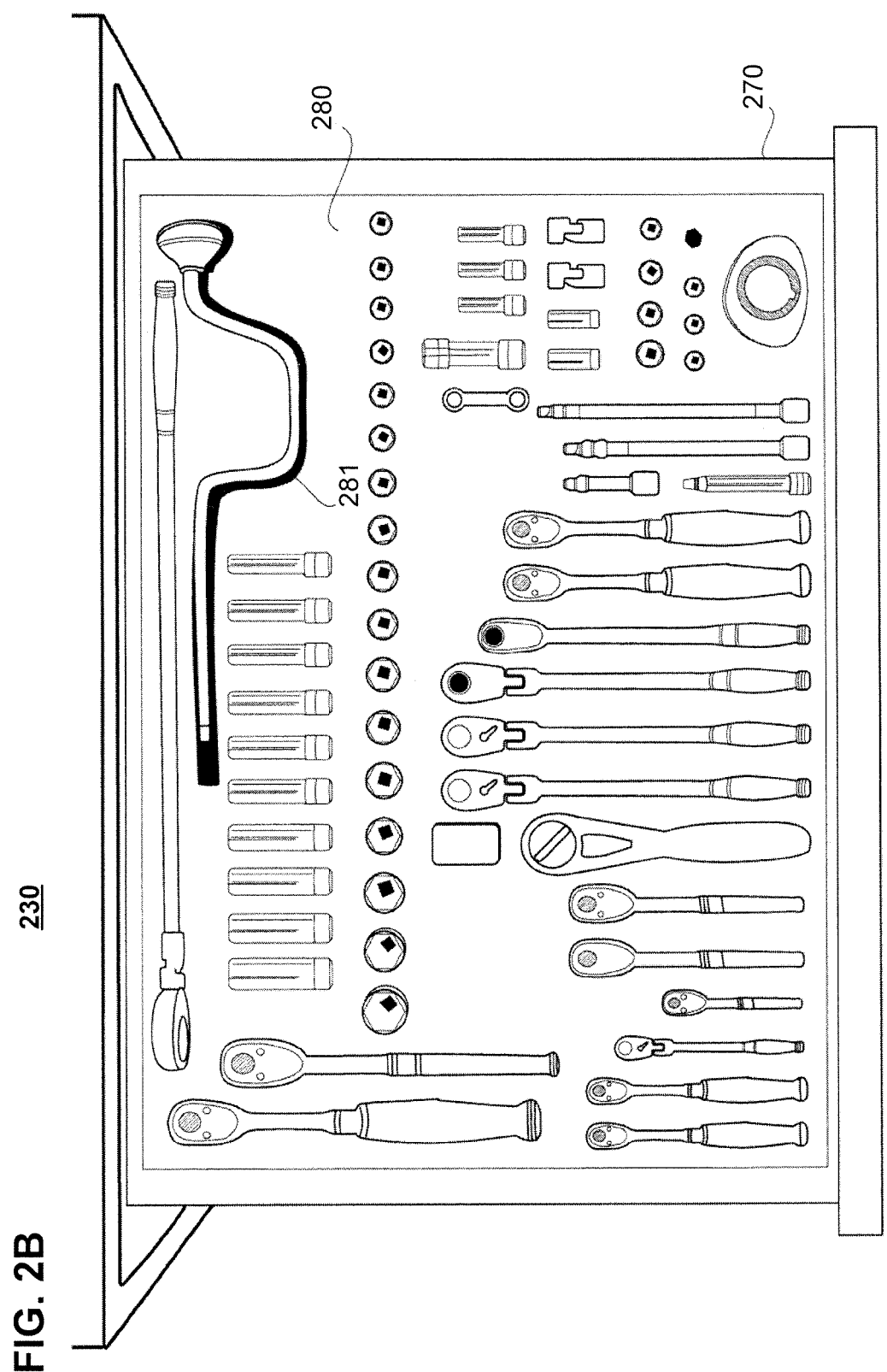

FIGS. 2B and 2C show detailed views inside exemplary storage drawers 230 in the open mode. Each storage drawer 230 includes multiple storage locations for storing various types of tools or other inventory items, as in the case of FIG. 2B, or storing space battery packs 113, as in the case of FIG. 2C. As used throughout this disclosure, a storage location is a location in a storage system for storing or securing objects. In one embodiment, each tool has a specific pre-designated storage location in the tool storage system. While the embodiment shown in FIG. 2A includes a plurality of storage drawers 230, the storage device 200 can more generally include shelves, cabinets, storage chests, lockers, pegboards, or the like for storing tools, and storage locations substantially similar to those shown in FIGS. 2B and 2C can be used for storing tools and other inventory items.

Each storage drawer operates between a closed mode, which allows no access to the contents of the drawer, and an open mode, which allows partial or complete access to the contents of the drawer. When a storage drawer moves from a closed mode to an open mode, the storage drawer allows increasing access to its contents. On the other hand, if a storage drawer moves from an open mode to a closed mode, the storage drawer allows decreasing access to its contents. As shown in FIG. 2A, all storage drawers 320 are in closed mode; the storage drawers shown in FIGS. 2B and 2C is in open mode.

A locking device may be used to control access to the contents of the drawers 230. Each individual drawer 230 may have its own lock or multiple storage drawers 230 may share a common locking device. Only authenticated or authorized users are able to access to the contents of the drawers. The same locking device or a separate locking device can control access to batteries mounted in the battery mount 235 holding the battery packs 113 powering the operation of the storage device 200, or control a lock for securing batteries in the battery mount 235. In some examples, the battery mount 235 is mounted in a compartment or drawer, and access to the battery mount 235 is controlled by locking/unlocking a door or drawer providing access to the mount 235.

Each storage drawer 230 includes a foam base 280 having at least one storage location, such as cutouts 281, for storing tools. Each cutout is specifically contoured and shaped for fittingly receiving a tool with corresponding shapes. Tools may be secured in each storage location by using hooks, Velcro, latches, pressure from the foam, or other appropriate mechanisms. Different storage drawers of the device 200 (of FIG. 2A) may have different sizes, shapes, layouts and arrangements.

Referring back to FIG. 2A, display screen 205 provides an input and/or output interface for controlling operation of storage device 200 and/or system 100. Information entry via display screen 205 is possible such as by using a touch screen display. Access control device 206 is used to limit access to tool storage drawers 230 and/or batteries mounted in the battery mount 235 to authorized users only. Access control device 206, through the use of one or more locking devices, keeps all storage drawers 230 locked in a closed position and batteries mounted in battery mount 235 locked into place until access control device 206 authenticates a user's authorization for accessing storage system 200. Access control device 206 may use one or more access authentication means to verify a user's authorization levels, such as by using a key pad to enter an access code, a keycard reader to read from a key card or fobs authorization level of a user holding the card or fob, biometric methods such as fingerprint readers or retinal scans, or other methods. If access control device 206 determines that a user is authorized to access storage device 200, it unlocks some or all of the storage drawers 230, depending on the user's authorization level, allowing the user to remove or replace tools. The access control device 206 can also unlock some or all of the batteries mounted in the battery mount 235 depending on the user's authorization level and, in some situations, depending on whether the battery packs 113 are currently in use. In one embodiment, access to each storage drawer 230 and to the batteries mounted in the battery mount 235 is controlled and granted independently. Access to batteries in the battery mount 235 can also be granted individually in embodiments in which the access control device 206 can lock or release batteries individually in the mount 235. Based on an assigned authorization or access level, a user may be granted access to one or more drawers of device 200, but not to other drawers. In one embodiment, access control device 206 relocks a storage drawer 230 or the battery mount 235 when or after a user closes the drawer or loads a battery within the mount 235.

The location of access control device 206 is not limited to the front of storage device 200. It could be disposed on the top of the system or on a side surface of the system. In one embodiment, access control device 206 is integrated with display screen 205. User information for authentication purpose may be input through display device with touch screen functions, face detection cameras, fingerprint readers, retinal scanners, or any other types of devices used for verifying a user's authorization to access storage device 200. The access control device 206 may include one or more of a keypad, card-reader, or other user input interface, as well as one or more locks used for permitting/restricting access to storage locations and battery packs, a lock control board including a processor/controller and other circuitry used to control the locks and the user input interface, and the like.

Figure 3A:
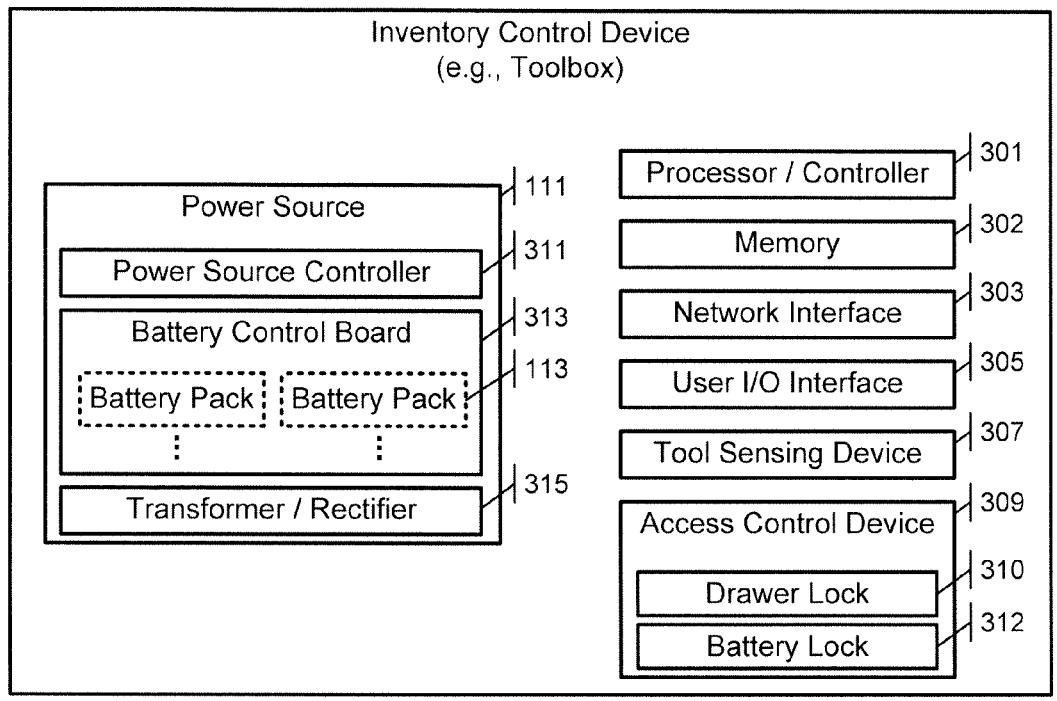
FIGS. 3A-3C are schematic diagrams showing components of a tool control device and of battery packs used to power the inventory control device.
Figure 3C:
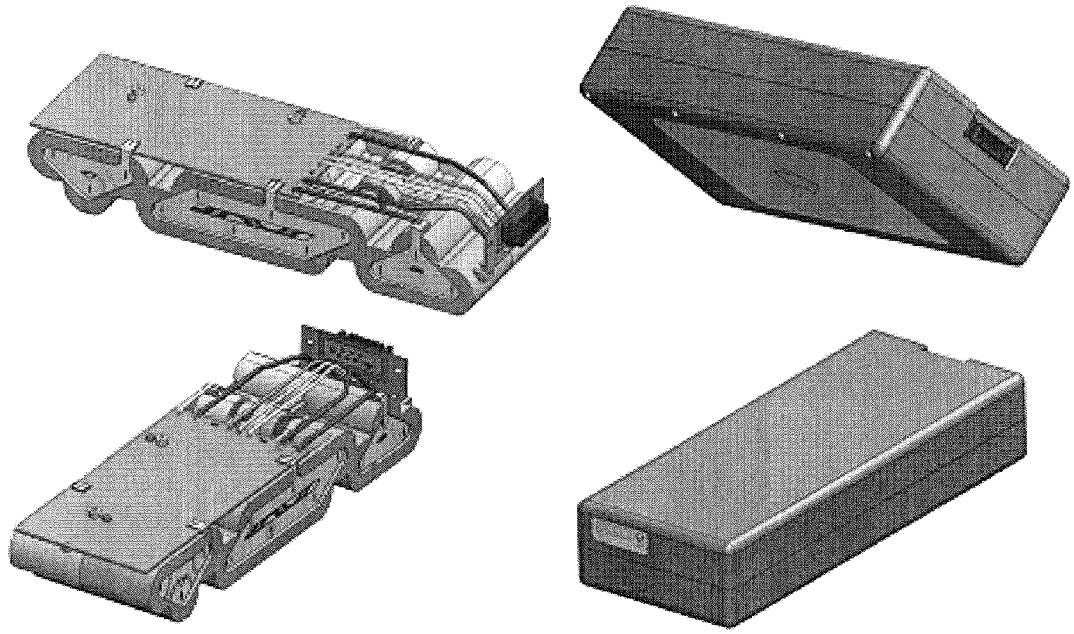
Figure 3B:
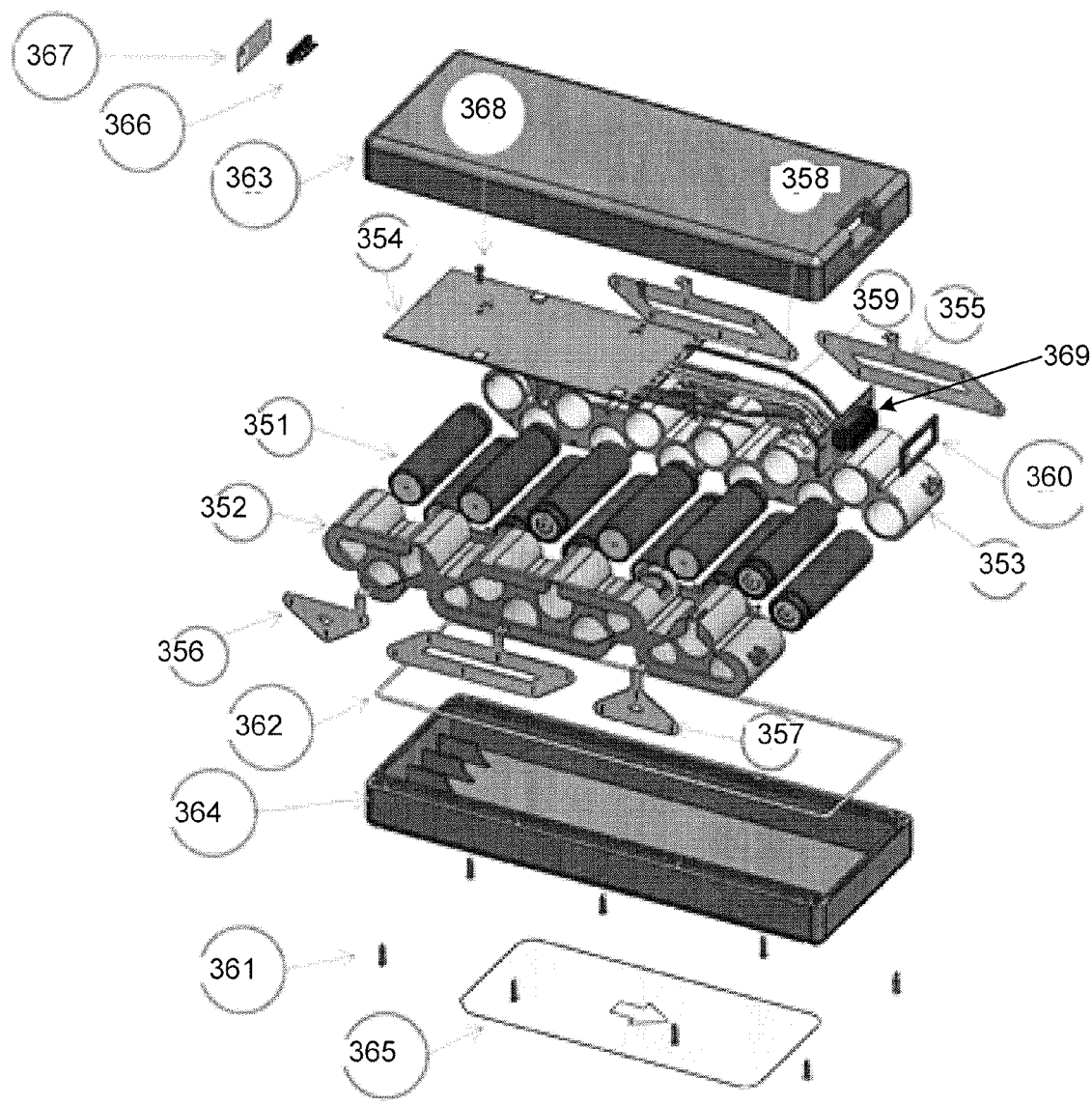

FIGS. 3A-3C show components of a tool control device 101 and of a battery pack 113 used to power the inventory control devices 101 of the ETCS 100. Specifically, FIG. 3A is a block diagram showing components of the tool control device 101; FIG. 3B shows an exploded view of a battery pack 113; and FIG. 3C shows assembled views of the battery pack 113 of FIG. 3B.

As shown in FIG. 3A, the inventory control device 101 includes a processor/controller 301 and a memory 302 jointly controlling the operation of the inventory control device 101. The memory 302 stores program instructions for execution on the processor/controller 301. The memory 302 also stores data for use by the processor/controller 301 during execution. Execution of the program instructions on the processor/controller 301 cause the processor/controller 301 to control the tool control device 101 to perform the functions described herein. A network interface 303 enables the tool control device 101 to communicate across wired and/or wireless communication networks (e.g., network 103). The network interface 303 can include Ethernet, Wi-Fi, mobile wireless, and/or other appropriate network interfaces. A user input/output (I/O) interface 305, including for example touchscreen display 205, enables the tool control device 101 to communicate information to a user and/or receive information or commands from a user. Additionally, tool sensing device 307 is operative to determine the presence and/or absence of tools from the tool control device 101. The access control device 309, which can include a card reader or other interface for receiving user identification information (e.g., access control device 206), provides user data to the processor/controller 301, which in turn authenticates the user data and provides coded instructions to the lock control board. In turn, the lock control board controls one or more drawer lock(s) 310 and optional battery lock(s) 312 to restrict access to drawers 230 (and tools contained therein) and battery packs mounted in the battery mount 235 only to authorized and/or authenticated users. The processor/controller 301 is in communication with the memory 302, network interface 303, user I/O interface 305, tool sensing device 307, and access control device 309 via a communication bus, and interfaces with and controls each of the components as part of controlling the operation of the inventory control device 101.

As described above in relation to FIG. 1 above, the tool control device includes a power source 111. The power source 111 is in communication with the processor/controller 301 via the communication bus, and can receive control commands from the power source 111. The power source 111 also provides electrical power to the processor/controller 301 and to the other components of the inventory control device 101. As shown in more detail in FIG. 3A, the power source 111 includes a power source controller 311, a battery control board 313, and a transformer/rectifier 315. The power source controller 311 interfaces with both the battery control board 313 and the transformer/rectifier 315 to ensure the supply of power to the tool control device 101. The power source controller 311 further interfaces with the processor/controller 301 to receive power-related commands from the processor/controller 301 and to communicate power and battery related information to the processor/controller 301 (and to the system-wide battery monitor 115 via the processor/controller 301 and network interface 303).

The battery control board 313 includes connections for one or more battery packs 113, and may be mounted within the battery mount 235. The connections enable the power source 111 to receive power from the battery packs 113. The connections further enable the battery control board 313 to obtain battery pack information (e.g., a battery pack identifier) from the battery pack 113, to monitor the performance and status of the battery pack 113, and to selectively control the charging and discharging of individual battery packs mounted in an inventory control device 101.

The transformer/rectifier 305 includes an input for receiving power from an electric power grid, for example via a power cable, and circuitry operative to convert AC power received from the electric power grid into power useable by the electrical systems of the inventory control device 101 (e.g., to convert 120 V AC power into 12 V direct current (DC) power). The transformer/rectifier 305 further includes an output for providing the transformed and rectified power to the power source 111 and on to the systems of the inventory control device 101. The transformer/rectifier 305 further optionally includes an output for providing power to the battery control board 313 to enable the charging of battery packs 113 mounted in the inventory control device 101.

In general, battery packs 113 are mounted and used in pairs in the inventory control device 101. In one example, a total of six battery packs can be mounted at the same time in an inventory control device 101 to supply power to the toolbox for 16 hours or more.

FIG. 3B shows an exploded view of an illustrative battery pack 113. In the example, the battery pack 113 includes twelve battery cells 351 such as lithium-ion battery cells. The battery pack 113 includes holders 352 and 353 used to securely hold the individual battery cells in place within the battery pack 113. For safety purposes, each cell is separated from its neighboring cell(s) by the injection-molded holders 352, 353. The anode and cathode of each individual cell 351 is connected to one of the metal lead plates 355, 356, or 357. The metal lead plates 355, 356, and 357 interconnect the battery cells 351 in parallel and/or series depending on the configuration of the battery pack 113. Each of the lead plates 355, 356, 357 is attached to wires that connect to a battery control printed circuit-board assembly (PCA) 354.

The battery control PCA 354 has a dual purpose. On the one hand, the battery control PCA 354 contains circuitry and firmware code operative to monitor the temperature, charge level (e.g., voltage and/or current), and other performance information of individual battery cells 351 in the battery pack 113. The battery control PCA 354 can also store battery pack identifying information including information on a battery pack type (and/or battery cell type), model number, manufacturer, and store operational characteristics (e.g., discharge rate), and in some examples can further compute and/or store a predicted remaining capacity and produce a warning when the battery pack 113 is almost fully discharged (e.g., when a remaining electrical power level of the battery pack falls below a minimum remaining electrical power level threshold). The battery control PCA 354 can also include circuitry and firmware code to enable the battery control PCA 354 to communicate with the battery control board 313 and the power source controller 311, for example to provide battery identifying information and battery performance information. The battery control PCA 354 can further include circuitry and firmware code to detect short circuit conditions within the battery pack 113, and open the connections to the battery cells 351 if such a condition is detected.

The battery control PCA 354 can report identity and/or operation information relating to the battery pack 113 using various communication standards including the SMBus two wire communication bus standard. For this purpose, the battery control PCA 354 is connected via lead wires 359 to a connector 369 (e.g., an 8-pin connector) for communication with the battery control board 313 and power source controller 311 of the inventory control device 101 in which the battery pack 113 is mounted. The lead wires 359 used for communication are generally distinct from the lead wires 358 carrying power from the battery cells 351 to the connector for providing power to the power source 111 and other systems of the inventory control device 101.

The battery pack 113 can further include a casing including an injection molded case top 363, an injection molded case bottom 364, screws 361, and an 0-ring 362 for sealing the battery cells 351 and battery control PCA 354. The PCA 354 can be secured to the holders 352, 353 by screws 368. An additional gasket 360 may be disposed around the connector 369 (e.g., the 8-pin connector) to seal the connector against intrusion from dust and/or water. Additionally, one or more LEDs 366, controlled by the battery control PCA 354, can provide status information of the battery pack 113. Labels 365 and 367 may identify the battery pack 113 (e.g., by serial number, model number, manufacturer, operational characteristics, and/or the like) as well as enable a user to interpret information communicated by the LEDs 366.

FIG. 3C shows various views of the battery pack 113 of FIG. 3B when it is fully assembled with and/or without the casing.

The battery packs 113 connect via the connectors 369 to one or more battery connection boards electrically coupled to the battery control board 313. In one example, two battery connection boards are mounted in the mount 235, and each battery connection board includes three connectors each configured to connect to a connector 369 of a battery pack 113. The battery connection board additionally includes copper wire traces for distribution of power and data, and includes three sets of connectors for connection to the battery control board 313 and power source 111.

The power source controller 311 and power source 111 include circuitry and firmware code and are operative to perform several primary functions. A first function is to receive DC power from a DC power supply (e.g., an output of a battery pack 113 or of the transformer/rectifier 315), to regulate the power, and then to distribute the power among various components within the electronic tool control device 101. The various components can include the battery packs (e.g., when charging a battery pack using power received via the transformer/rectifier 315), a motherboard communicatively interconnecting the processor/controller 301 and various other components shown for example in FIG. 3A, and a peripheral control board used to supply power to various components of the device 101 (e.g., cameras, drawer and battery locks, the display, and the like). In some examples, the motherboard provides power to the monitor 205, the access card scanner 206, and the other systems of the device 101. In this way, all components in the system are provided power.

The power source controller 311 can be a 16-bit CPU designed for low cost and, specifically, low power consumption embedded applications. The power source controller 311 can execute firmware programming code designed to control the distribution of power within the tool control device 101, manipulate battery pack related data, implement power savings features of the device 101 when AC power is not available, and communicate data to and from the motherboard and processor/controller 301 of the tool control device 101.

In one example, the power source controller 311 communicates with the processor/controller 301 via the motherboard using a universal asynchronous receiver/transmitter (UART). The data communicated from the power source controller 311 to the processor/controller 301 includes status changes of the batteries used for reporting. The data received by the power source controller 311 from the processor/controller 301 includes the activate battery exchange command in response to which the power source controller 311 sets all batteries as active to ensure no loss of power when batteries are removed.

The processor/controller 301 can control all the displays relating to battery condition on the display screen 205 of the inventory control device 101. The processor/controller 301 can further process battery-related data and other data stored in the memory 302, and can determine power saving configuration settings that are transferred through the UART to the power source controller 311 if AC power is determined to be unavailable (e.g., if the transformer/rectifier 315 does not receive power from the electric power grid).

A more detailed description of the functions and processing performed as part of providing battery pack monitoring and management by components of the inventory control device 101 will be described in relation to FIG. 4.

Figure 4:
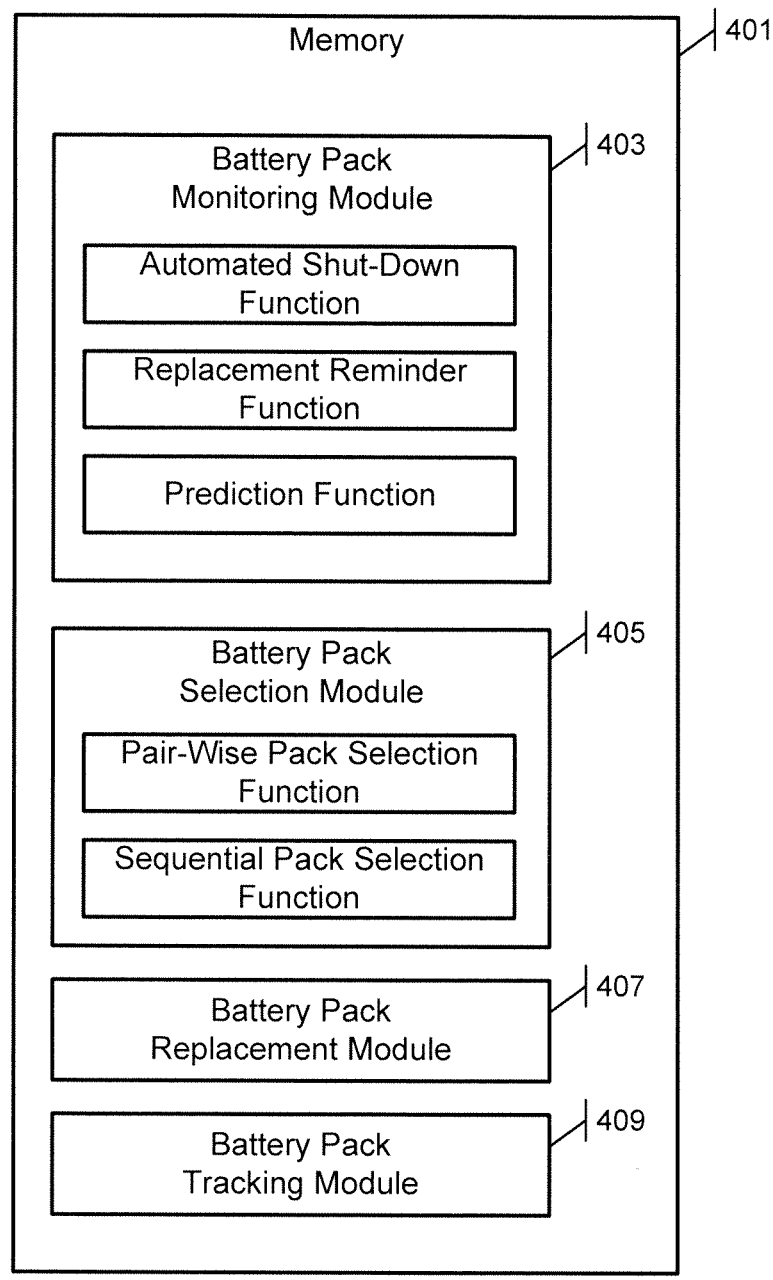
FIG. 4 is a schematic block diagram showing a memory storing programming code for various processing modules used in controlling the operation of the system of FIG. 1.

FIG. 4 is a block diagram showing a memory 401 storing programming code for various processing modules used in controlling the operation of the ETCS 100. The programming code and processing modules can include code and modules executable in the system-wide battery monitor 115 of the inventory control server 105, executable in individual inventory control devices 101 or charging stations 109, and/or executable in both the server and individual devices/stations as part of providing integrated battery monitoring and management services throughout the ETCS 100. In various situations described below, processing steps can be performed by the process/controller 301 of inventory control devices 101, by components of power sources 111 of inventory control devices 101, or by a processor of a charging station 109. Portions of the processing can additionally or alternatively be performed by a processor of the system-wide battery monitor 115.

A battery pack monitoring module 403 includes circuitry and executable code for controlling the monitoring of the operation of battery packs powering an inventory control device 101. The battery pack monitoring module 403 can, in particular, include circuitry and executable code for controlling the power source 111 of an inventory control device 101 to monitor all battery packs 113 currently mounted in the inventory control device 101.

The monitoring can include monitoring of the current performance of each battery pack 113, and the logging of performance data for each battery pack 113. Current performance data for a battery pack 113 can include a current charge level, current temperature, current output voltage and/or output current, and the like, and can be used to determine whether the battery pack 113 is fully charged, partially charged, partially discharged, or fully discharged, whether the battery pack 113 should be used to power the device 101, should be disconnected from powering the device 101, or should be replaced. The current performance data can also be used in controlling the amount of power drawn from the battery pack 113, and for computing predictions of remaining charge levels and discharge times of the battery pack 113. Additionally, the logged performance data, also referred to as historical performance data of a battery pack 113, can be used to monitor the condition of the battery pack over time and determine whether the battery pack 113 should be replaced. The logged performance data can further be used to refine predictions of remaining charge levels and discharge times of the battery pack 113 based on data from previous charging/discharging cycles of the battery pack or other similar battery packs.

In addition, the battery pack monitoring module 403 can control the processor 301 and user I/O interface 305 to display information on the status of each battery pack mounted in the inventory control device 101, and to display battery pack or system alerts. Examples of display screens and system alerts are shown in FIGS. 5A-5I. The battery pack monitoring module 403 can control the processor 301 and the network interface 303 to cause battery pack information to be reported to the system-wide battery monitor 115, or to receive historical battery pack information from the system-wide battery monitor 115.

The monitoring of the battery pack information is based on battery information obtained at various levels. The battery control PCA 354 monitors the temperature, charge level (e.g., voltage and/or current), and other performance information of individual battery cells 351 in the battery pack 113, and reports the information to the battery control board 313. The battery control PCA 354 also provides battery pack identification information. The battery control board 313 is equipped with firmware, software, and hardware designed to obtain data from the battery pack 113, to provide control of the battery pack (e.g., to connect/disconnect the battery pack so as to cause the battery pack to provide/not provide electrical power to the components of the inventory control device 101), and to relay the battery pack data to the power source controller 311 for further processing and display on various local or remote devices. Specifically, the information for each battery pack is provided by the battery control board 313 to the power source controller 311, and used both by the battery control board 313 and power source controller 311 for controlling the supply of power to the inventory control device 101 and for providing battery-related displays on the display screen 205. Additionally, the information for each battery pack is provided to the system-wide battery monitor 115 via the network interface 303, such that the monitor 115 can monitor and control the operation of battery packs throughout the ETCS 100.

In both the inventory control device 101 and in the system-wide battery monitor 115, the battery information obtained from each battery pack's battery control PCA 354 can be used to calculate and display battery charge level. In addition, the battery status, condition information, and related alerts or notices can be distributed to networked devices, the Internet, messaging service message (e.g., text message), e-mail, twitter, instant messaging, voice-mail, or other electronic forms of communications to remote networked devices such as mobile phones, smart phones, tablets, pagers, personal computers, and other remote devices. As such, users and managers of the ETCS 100 can access and monitor battery pack information, and can receive battery pack related alerts and notifications.

The battery pack information that is monitored and logged can include a remaining battery pack charge level along with the identification of any battery pack requiring recharge (including identification of the location of the battery pack, such as identification of the device 101 or charging station 109 having the battery pack mounted therein). Each inventory control device 101 or charging station 109 may provide information for those battery packs mounted therein, including the battery pack serial number, charge/discharge status, charging/discharging rate, temperature, amperage draw, and other conditions. The inventory control devices 101 and charging station 109 can further provide alerts when a battery pack 113 reaches full charge or when the battery pack 113 is nearing or has reached total discharge, and/or can provide reminders to system operators to recharge batteries (e.g., in anticipation of predicted future needs, for example based on knowledge that a new work shift will begin soon). The system, including the monitor 115, devices 101, and charging station 109, can further provide automated charging of battery packs at programmable/scheduled times (e.g., to begin charging a predetermined number of hours prior to the start of a work shift) and automated display of battery pack conditions in order to ensure that battery packs 113 throughout the ETCS 100 are managed optimally. The display of battery pack conditions can further assist a manager or worker to locate fully charged battery packs that are not currently in use, to enable the worker or manager to retrieve a fully charged battery pack for his/her own use.

The battery pack monitoring module 403 can further implement an automated shut-down function. As part of monitoring the remaining charge level or electrical power level of battery packs 113 in an inventory control device 101, the power source controller 311 may detect that all battery packs 113 mounted in the device 101 have reached a lower (or minimum) remaining electrical power level threshold. The lower remaining electrical power level threshold can correspond to a discharged level below which the voltage across terminals of the battery pack 113 drops below a supply voltage of the battery pack 113, for example. Upon making such a determination, the power source controller 311 may issue an alert to notify a user that all battery packs are fully discharged (see, e.g., FIG. 5F). If the power source controller 311 further determines that no power is received from the transformer/rectifier 315, the power source controller 311 can issue a power-down alert to notify a user that the device 101 will be powered down momentarily due to insufficient remaining power (see, e.g., FIG. 5H). In turn, the power source controller 311 may notify the processor/controller 301 to initiate the powering down of the inventory control device 101.

The low-power and power-down alerts are generally provided on the display 205 of the inventory control device 101 having the low battery power level, and can additionally be provided via the system-wide battery monitor 115 to other users (e.g., to be provided on the computer terminal 107, or on another networked device via the internet, text messaging, email, or the like).

The powering down is a planned, orderly, and efficient shutdown of the inventory control device 101, including shutdown of the computers and electronics (and optional locking of the drawers and battery mount), that takes place at a predetermined remaining battery charge level which is above a battery charge level at which a system failure may occur due to inadequate power supply. Specifically, the powering down is triggered by the power source controller 311 at a time when charge levels of the battery packs 113 mounted in the inventory control device 101 remain at a level capable of providing adequate power to complete an orderly shutdown sequence.

In some examples, the powering down is triggered at a battery charge level that is sufficient to not only power the shutdown sequence but to also temporarily restart the device 101 so as to resend to the battery monitor 115 the remaining battery charge levels, to display on screen 205 the remaining battery charge levels and shut down related alerts and warnings, and to power down the device 101 again in an orderly way. In such examples, the predetermined remaining battery charge level at which the power down sequence is triggered is selected such that the system can complete the restart and shutdown process in a situation in which the discharged battery packs have not been replaced with recharged battery packs at the time of the restart operation.

As part of monitoring the charge status of battery packs, the battery pack monitoring module 403 is further operative to provide automated reminders to recharge battery packs. The capability of the system to monitor the charge levels of the individual battery packs and pairs of battery packs allows for the distribution of warnings relating to battery pack charge levels and reminders to recharge individual or pairs of battery packs. The reminders can be provided on the display screen 205 or other peripheral of an inventory control device 101, or via the system-wide battery monitor 115 on other networked devices. Additionally, reminders to check the charge levels of the battery packs can be programmed to display on various devices at predetermined times. The predetermined time may be at the end of a work shift, prior to a work break, or at other notable times during the working day.

The monitoring of battery packs in individual inventory control devices 101 results in historical battery pack performance data being gathered. Furthermore, the communication of the battery pack performance information to the system-wide battery monitor 115 enables the monitor 115 to maintain a record of battery pack performance information for each battery pack 113 regardless of which device(s) 101 and charging station(s) 109 the battery pack 113 has been used in, throughout the ETCS 100 and over the course of the lifetime of the battery pack 113. The historical battery pack performance information can be used to predict the future performance of each battery pack 113 based both on the battery pack's own past performance data and on other similar battery packs' past performance data. Computations associated with the prediction functions can be performed by the monitor 115, or performance data can be provided to individual device(s) 101 and charging station(s) 109 to enable the prediction-related processing to be performed locally in the device 101 or station 109.

The prediction functionality can include processing to determine the current charge level of a battery pack and or battery pack pair, to determine a usage rate of an inventory control device 101 from the system log files, to determine the power draw of the device 101 for the determined usage rate, and to thereby predict the remaining discharge time for each battery pack and pair of battery packs in use in the system 100. The prediction information can be displayed on a local inventory control system display screen 205, on the administration computer 107, and/or on various other networked devices.

The prediction functionality can further include processing to determine an existing charge level of an individual battery pack and or battery pack pair that is being charged (e.g., in the charging station 109, or in an inventory control device 101 that is plugged in to the electric power grid), to determine the charge rate as provided by the charging station controller or battery control board 313, and to predict the remaining charge time required for each battery pack. The prediction information can be displayed on the local charging station 109 or inventory control device 101, on the administration computer 107, and/or on various devices as listed above.

The prediction functionality can further include processing to provide advance warning of the availability of battery packs for the next work shift or future/scheduled event. Battery pack data and requirements for the beginning of the shift are entered into an inventory control device 101 by a user or into the computer terminal 107 by a system administrator or manager. The requirement information along with information on the number of available battery packs (by serial number) and charge levels of those battery packs is gathered. The system, either through processing in the device 101 or processing by the system-wide battery monitor 115, determines through software the available battery packs located in the local device 101 and in the charging station 109, determines the charge level of each battery pack, determines the rate of usage and power consumption by the device 101 of the battery packs 113 to predict the remaining charge of the battery packs at the future/scheduled event time, and further determines the availability of newly charged batteries for the next shift or work period from the charging station 109. Based on this information, the system can display the information and determine whether sufficient charged battery packs will be available at the future/scheduled time. In some examples, the computation is performed by the battery monitor 115 based on usage rates of battery packs in all inventory control devices 101 of the ETCS 100 to determine system-wide battery pack availability for the next work shift or other scheduled event.

Additionally, the prediction functionality can further include processing to provide long term predictions regarding the usable life of individual battery packs based on predetermined charge and discharge curves, current and historical charge levels for each battery pack and a predetermined limit on the total number of charge and discharge cycles for each individual battery pack. The system determines the predicted replacement date for each battery pack by calculating with software the date when the battery pack will reach the end of its useful life. This information can be displayed on the local tool control system, on the administration computer, and on various devices as listed above A battery pack selection module 405 includes circuitry and executable code for controlling the selection of battery packs for powering inventory control devices 101. The battery pack selection module 405 can, in particular, include circuitry and executable code for controlling the power source 111 of an inventory control device 101 to select one or more battery packs 113, from among battery packs mounted in an inventory control device 101, for providing power to components of the inventory control device 101.

An inventory control device 101 can have a plurality of battery packs 113 mounted therein. In one example, the device 101 can have up to six battery packs 113 mounted therein such that the device can be powered by all six battery packs 113 at the same time. However, the battery pack selection module 405 may select only a subset of the battery packs 113 to power the device 101 at a time such that the remaining battery packs (no included in the subset) are not initially discharged. The battery pack selection module 405 may then monitor charge levels or conditions of the subset of battery packs, and cause a switch in battery packs when one of the battery parks in the subset becomes fully discharged. Specifically, the module 405 may cause a battery with a higher charge level to beginning powering the inventory control device 101 and may disconnect the discharged battery pack.

In one example, the battery pack selection module 405 controls the selection of battery packs for pair-wise battery pack selection. As such, the module 405 generally causes the power source controller 311 to select two battery packs 113 to power the device 101 at a time. Because two battery packs 113 are selected to power the device 101, the device 101 can continue to receive power even if a fault occurs in one of the two selected battery packs, if one of the two selected battery packs 113 is unexpectedly disconnected, or the like. The pair-wise selection of battery packs can therefore improve the reliability of the power supply to the device 101, and thereby reduce the occurrence of faults occurring as a result of battery-related failures or events.

The battery pack selection module 405 can additionally or alternatively control the selection of battery packs for sequential battery pack selection. Under this selection mode, the battery pack selection module 405 causes the power source controller 311 to select a subset of the battery packs 113 (e.g., a pair of battery packs 113) mounted in the device 101 to power the device 101. In one example, the pair-wise selection includes determining the charge levels of each battery pack in an inventory control device 101, determining the two battery packs with the lowest level of remaining charge, and selecting the two determined battery packs to provide initial power to the device 101 while the other battery packs are not used to power the device 101. The power source controller 311 monitors the remaining electrical power levels of the battery pack(s) 113 currently powering the device 101. When the remaining electrical power level of one or both battery packs 113 currently powering the device 101 reaches a lower (or minimum) remaining electrical power level threshold, the power source controller 311 causes another battery pack 113 to start powering the device 101 and disconnects the one battery pack 113. The one battery pack 113 is disconnected only after power is provided from the other battery pack 113, to ensure that the device 101 is provided with power to operate during the transition to the new/other battery pack 113. The lower (or minimum) remaining electrical power level threshold can be selected as a discharged level below which the voltage across terminals of the battery pack 113 drops below a supply voltage of the battery pack 113, for example.

According to the sequential battery pack selection function, the power source controller 311 can select the battery packs in a sequence such that the battery packs with the lowest remaining electrical power level are used to power the device 101 before other battery packs (such as battery packs having higher remaining electrical power levels). As such, the power source controller 311 may determine a remaining electrical power level in each of the plurality of battery packs. Then, the power source controller 311 may identify, among the plurality of battery packs, one or more battery packs having remaining electrical power levels that exceed a minimum remaining electrical power level threshold. Finally, the power source controller 311 may provide the electrical power to the processor 301 and other components of the device 101 from one battery pack (or a pair of battery packs) of the plurality of battery packs that is determined to have the lowest remaining electrical power level among the battery packs identified as having remaining electrical power levels exceeding the minimum remaining electrical power level threshold. In turn, upon determining that the remaining electrical power level of the one battery pack has fallen below the minimum remaining electrical power level threshold, the power source controller 311 may identify one or more other battery packs having remaining electrical power levels that exceed the minimum remaining electrical power level threshold. The power source controller 311 then provides the electrical power to the processor 301 and other components of the device 101 from a battery pack (or pair of battery packs) that is determined to have the lowest remaining electrical power level among the one or more other battery packs identified as having remaining electrical power levels exceeding the minimum remaining electrical power level threshold.

A battery pack replacement module 407 includes circuitry and executable code for controlling the operation of the power source 111 during the replacement of battery packs. In embodiments in which battery packs 113 are removable from an inventory control device 101, the battery packs can be replaced for example to replace a discharged battery pack with a newly/fully charged battery pack. The battery pack replacement module 407 includes circuitry and/or executable code for controlling the power source 111 during a battery pack replacement operation. The replacement operation is initiated in response to receiving a user command to replace a battery pack (e.g., through a user selection of a battery pack to be replaced via the user I/O interface 305), an automated determination that a battery pack should be replaced (e.g., in response to the power source 111 identifying a fully discharged battery pack 113 and automatically initiating a replacement process), or a command received from the network 103 to replace a battery pack 113 (e.g., a command received from the system-wide battery monitor 115). Once the replacement operation is initiated, the power source controller 311 determines the battery pack(s) 113 that should be replaced (for example, based on identification of the battery packs included in the command to initiate the replacement). The power source controller 311 then controls the battery control board 313 to ensure that the determined battery pack(s) 113 are not currently providing electrical power to the device 101. If the determined battery pack(s) 113 are currently providing electrical power to the device 101, the battery control board 313 causes one or more other battery pack(s) 113 to start powering the device 101 and cuts off the flow of electrical power to/from the determined battery pack(s). If no other battery pack(s) 113 are available and if power is not currently available from the transformer/rectifier 315, the battery control board 313 signals the power source controller 311 to interrupt the replacement operation and issue a related user-alert notifying the user can removal of the battery pack will result in a system crash.

If the battery control board 313 confirms that the determined battery pack(s) 113 are not currently providing electrical power to the device 101 (or have been disconnected from the device 101), the battery pack replacement operation can proceed. If necessary, the power source controller 311 signals the access control device 309 to release the battery lock 312 on at least those battery pack(s) 113 that are to be replaced. A user can then remove the appropriate battery pack(s) 113 from the device 101, and optionally load new battery pack(s) 113 in their place. The battery control board 313 detects the new battery pack(s) 113, obtains identifying information and remaining power level from the battery pack(s) 113, and resumes normal operation.

In some examples, in response to the initiation of a battery pack replacement operation, the power source controller 311 causes the pair of battery packs from which power is being drawn to be changed to the next lowest charged pair of battery packs, such that the pair of battery packs that were powering the device 101 (and are therefore at least partially discharged) can be removed and replaced.

In some examples, the device 101 includes one or more back-up or permanent battery packs that are built-in (e.g., non-removable) from the inventory control device 101. The back-up or permanent battery pack(s) can be the only battery packs mounted in the inventory control device 101, or the back-up or permanent battery pack(s) can be provided in addition to one or more battery pack(s) removably mounted in the inventory control device 101. In examples in which a back-up or permanent battery pack is provided in addition to one or more removable battery packs, the battery replacement operation may proceed even if such a replacement operation will result in all removable battery packs 113 being removed from the device 101. In the examples, power can be drawn from the back-up/permanent battery pack during any period during which all removable battery packs 113 are removed from the device 101 when no power is available from the transformer/rectifier 315. Further, the power source controller 311 may be operative to maintain a full charge in the back-up/permanent battery pack whenever possible, for example by re-charging the back-up/permanent battery pack whenever power is available from the transformer/rectifier 315 or from removable battery packs 113. By maintaining a full charge in the back-up/permanent battery pack, power may be available from the back-up/permanent battery pack when no other battery packs are present in the device 101 or when all removable battery pack 113 are fully discharged to the point of being no longer able to supply adequate power. The back-up/permanent battery pack may store at least sufficient power to complete a planned, orderly, and efficient shutdown of the inventory control device 101 when no other source of electrical power is provided to the device 101. In particular, the back-up/permanent battery pack may store sufficient power to shutdown the computers and electronics (and optional locking of the drawers and battery mount) of the device 101.

A battery pack tracking module 409 includes circuitry and executable code for controlling the ETCS 100 during operation in order to monitor the location of battery packs. The tracking of battery packs can be performed at the level of individual inventory control devices 101. In general, however, the tracking is performed by the system-wide battery monitor 115 based on battery information received from inventory control devices 101 and charging station 109. The system-wide battery monitor 115 can track the location of battery packs based on information received from inventory control devices 101 and charging station(s) 109 relating to battery packs that are currently mounted in (and electrically connected to) the devices 101 and station 109. The system-wide battery monitor 115 can further track the location of battery packs based on information on battery packs 113 that are stored as inventory items in inventory control devices 101, such as spare battery packs that are stored in a drawer 230 of an inventory control device 101. Based on this information, the monitor 115 maintains a log of the location of each battery pack 113, and includes a log entry relating to the removal of a battery pack 113 from any device 101 or station 109 or the placement of a battery pack 113 in any device 101 or station 109. Each log entry includes an identifier uniquely identifying a battery pack 113, a date/time stamp, and identification of the related action (e.g., removal or placement). Additionally, a log entry can include identification of the user having removed or replaced the battery pack based on user-identification information obtained for example via the access control device 309.

In order to support the battery pack tracking functionality, unused battery packs can be stored in an inventory control device drawer 230 (e.g., in pockets in a foam layer specifically designed to fit the battery, as shown in FIG. 2C), or in a shelf, cabinet, locker, or other storage location of a storage device 200. The battery may have either a bar code (e.g., as shown in FIG. 2C) or other marking (e.g., low or high frequency, passive or active, RFID chip or component) which can be read by cameras or other tool sensing devices. The bar code or marking contains data relative to the identification of the individual battery, such as a serial number. The presence or absence of the battery from the pocket in the tool control device is determined through evaluation of physical attributes of the drawer when the battery is present as compared to the attributes of a baseline image of the drawer when the battery is absent. In this way, the presence or absence of individual batteries can be known when the batteries are stored in a storage drawer 230 of an inventory control device 101. In examples in which a battery pack includes an RFID chip for identification, the location of the battery pack can be determined using a portable or fixed scanner to locate a battery pack in three dimensional space (e.g., in a work area, a hangar, the interior of an aircraft or other workspace, or the like). In some examples, the RFID chip may be an active RFID chip that is powered by the battery pack itself.

The battery pack tracking functionality may rely on or interface with various battery pack security features implemented in the ETCS 100. Specifically, the ETCS 100 may provide two levels of security relative to the battery packs 113. The first level of security is provided by requiring a user to be logged into an inventory control device 101 in order to remove or install a battery pack in the device 101. User credentials may thus be verified to access a battery mounted in the battery mount 235 of an inventory control device 101, a charging station 109, or any other networked device used to store or charge a battery pack. Each device 101 and station 109 may thus be equipped with a scanner (e.g., access control devices 206 and 309) to allow a user to log into the device/station and utilize the system to the permission level he/she is authorized. The user identification and authentication can be based on stored user data, as well as users' access cards or other identification methods such as the use of bio ID scanners, magnetic stripe cards, bar codes, or the like.

The ETCS 100 may, based on such battery pack security features, monitor the presence or absence of battery packs in the system and produce alerts including detailed information about a change in battery pack status that can be displayed on a display screen 205 or computer terminal 107. Alerts can be distributed electronically via network 103 and/or the Internet to other networked electronic devices. As such, an administrator of the system can be alerted if a battery pack presence or absence condition has changed without an authorized user being logged into the corresponding toolbox or charging station (see, e.g., FIG. 5E). The system can further record the change in battery pack presence or absence condition in a log file (see, e.g., FIG. 5B), along with identification of the authorized user or an indication that no user was authorized for the procedure, and other pertinent data such as time and date, battery serial number, toolbox serial number, remote charger device id code, or the like.

The ETCS 100 can additionally provide locks for locking the battery packs in their battery mount 235, plugs (e.g., 369), charging stations, or other networked storage locations. The battery locks 312 may require an authorized user to log into the system in order to be unlocked. A lock may include an electromechanical device controlled by software code and hardware in the ETCS 100. The user can activate the lock by changing status of a "lock" icon displayed on the display screen 205 of an inventory control device 101, for example.

In addition to monitoring battery performance information, the ETCS 100 may monitor safety-related information. The electronics and software in the system are capable of providing data relative to the temperature of the batteries, the amperage draw, and the identification of a bad component in the batteries themselves, and in the battery control and charging circuits. The system can also determine if and when extreme conditions exist and shut down the system when such extreme and possibly dangerous conditions exist. The system can also be programmed to shutdown at a predetermined level of over-temperature and/or amperage that is below a temperature or amperage at which dangerous conditions may occur. Automated messages, including recommendations to have the system 100 or a device 101 checked by a qualified technician can be displayed on the local tool control system, on the administration computer, and on the various other devices as listed above FIGS. 5A-5I are screen-shots of display screens that may be provided on display screen 205, on a display screen of the computer terminal 107, or on display screen of other networked devices on which battery-related information is provided. The screen-shots were referenced as part of the description of FIG. 4, and reference can be made to such descriptions for further information.

Figure 5A:
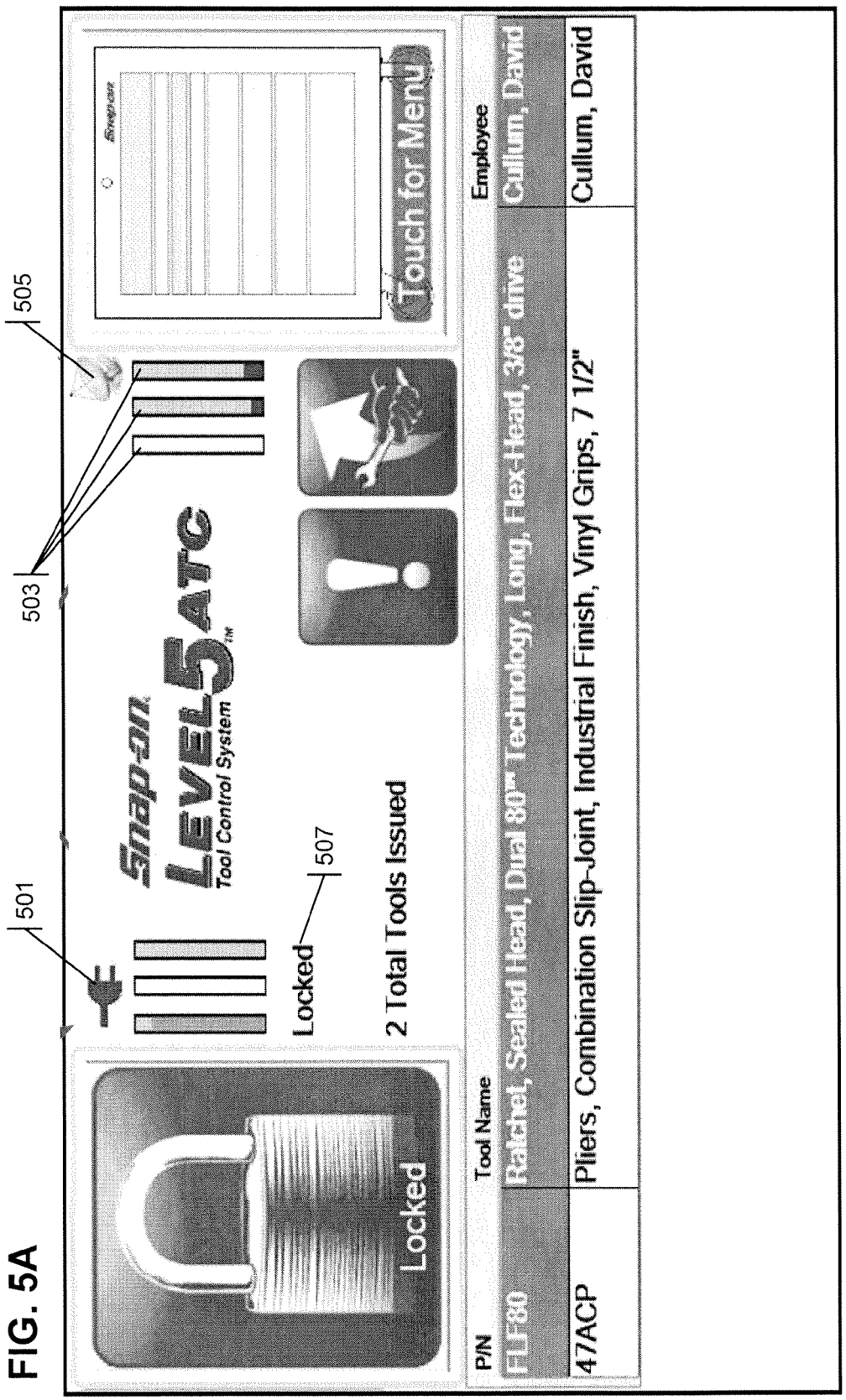

FIG. 5A is a screen-shot of a display screen shown on a display screen 205 of an inventory control device 101 during operation. The screen-shot shows an icon 501 indicating that the device 101 is currently plugged into an AC outlet and is receiving power from the electric power grid. Bar icons (e.g., at 503) further show the battery charge levels of each battery pack mounted in the device 101. The charge level is illustratively shown based on the height of the bar icon, while blank/white bar icons correspond to battery packs that are electrically disconnected from the power source and are ready for removal and replacement. Icon 505 indicates that the device 101 is communicatively connected to the inventory control server 105 via the communication network 103. Icon 507 indicates that the battery packs in the battery mount 235 are locked to prevent unauthorized removal of battery packs.

Figure 5B:
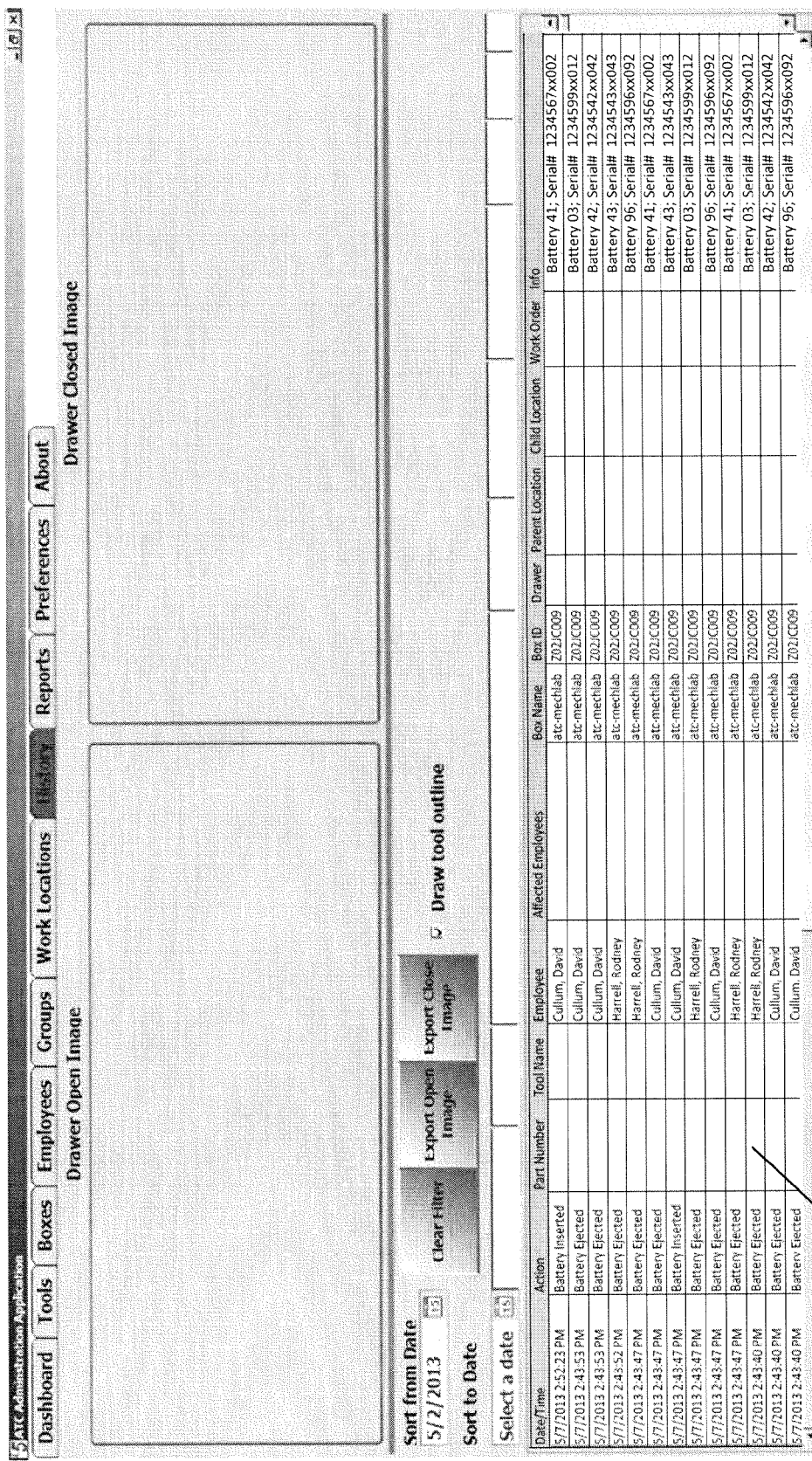

FIG. 5B is a screen-shot of a display screen shown on a display screen of a computer terminal 107 associated with the inventory control server 105. The screen-shot shows a battery pack information log 511 in which each line corresponds to a different action performed on a battery pack in the ETCS 100. As shown in log 511, monitored actions include the insertion/loading and removal/ejection of battery packs. Each log entry has an associated date and time stamp, and identifies the action performed, the employee associated with the action, the inventory control device or charging station (i.e., the "box") in which the action was performed, and the serial number of the battery pack.

Figure 5C:
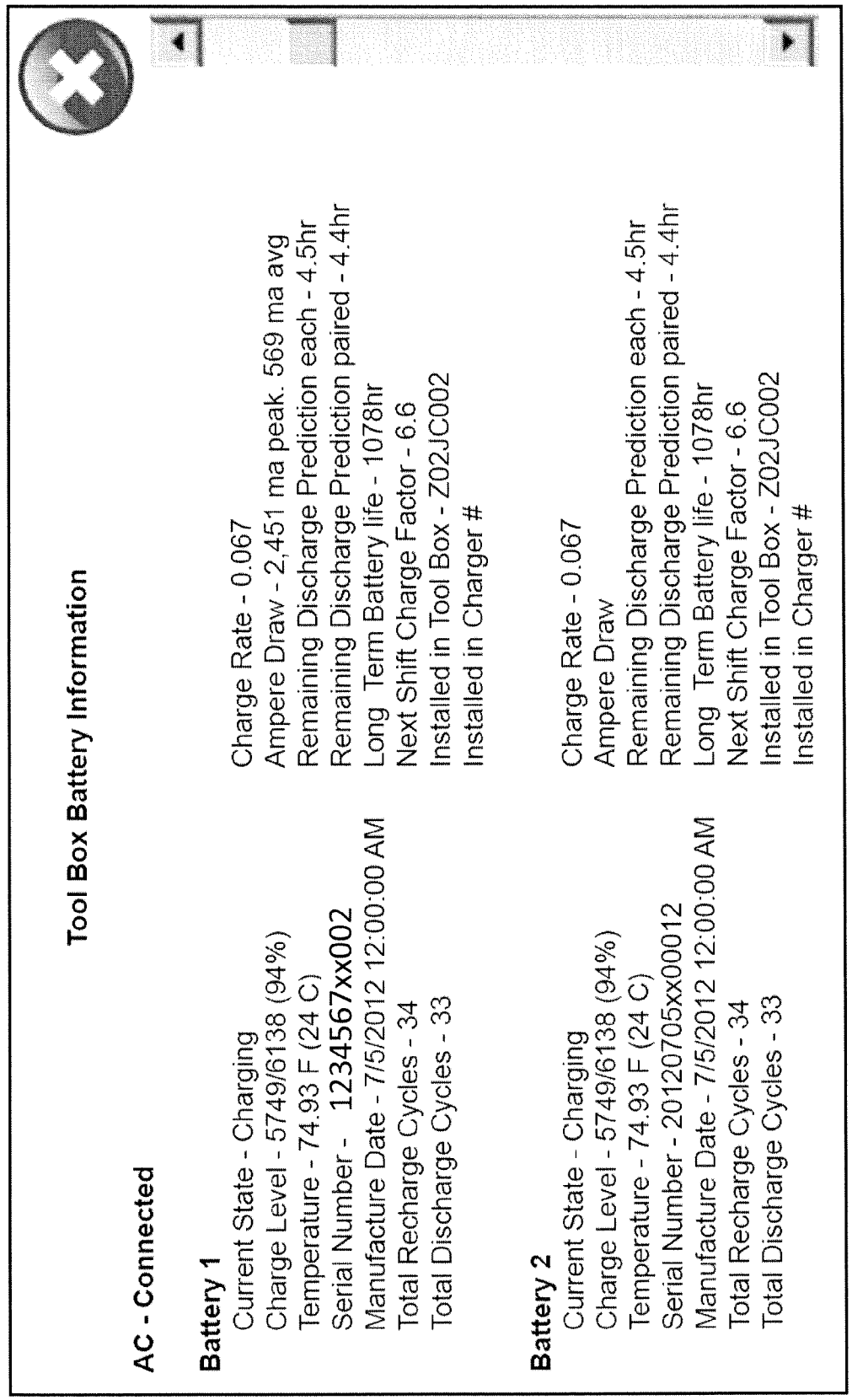

FIGS. 5C, 5D, and 5I are battery pack information screens respectively provided for an inventory control device 101, a charging station 109, and a computer terminal 107. The display screen displays a current status of the device or station (e.g., AC—Connected), and battery pack information for each battery pack currently mounted in the device or station. At least some of the battery pack information is retrieved directly from the battery pack (e.g., a battery pack serial number), while some of the other battery pack information displayed on the screen is retrieved from a memory of the device/station or of the system-wide battery monitor. The retrieved information can include data on long term battery life, total recharge/discharge cycles, manufacture date, and the like.

Figure 5E:
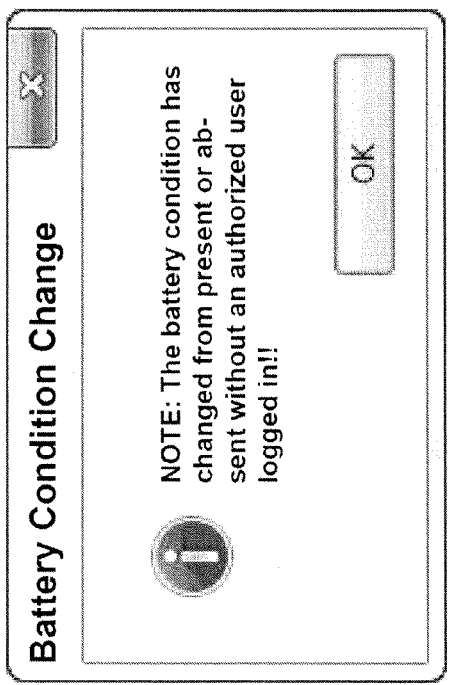
Figure 5F:
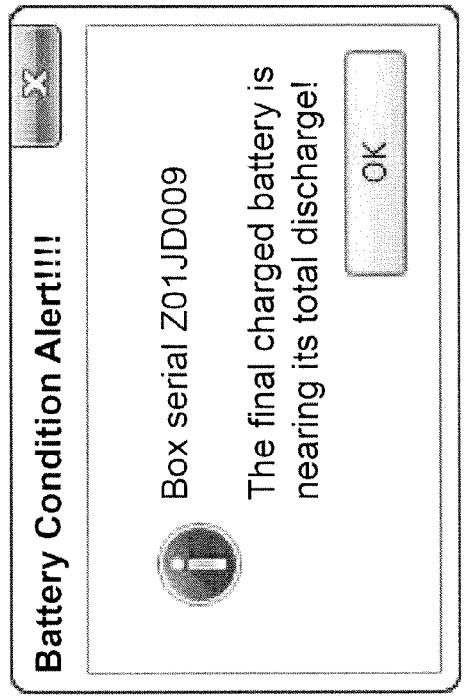

FIGS. 5E and 5F are alerts displayed to a user of a device 101, station 109, terminal 107, or other networked device receiving alerts from the ETCS 100.

Figure 5G:
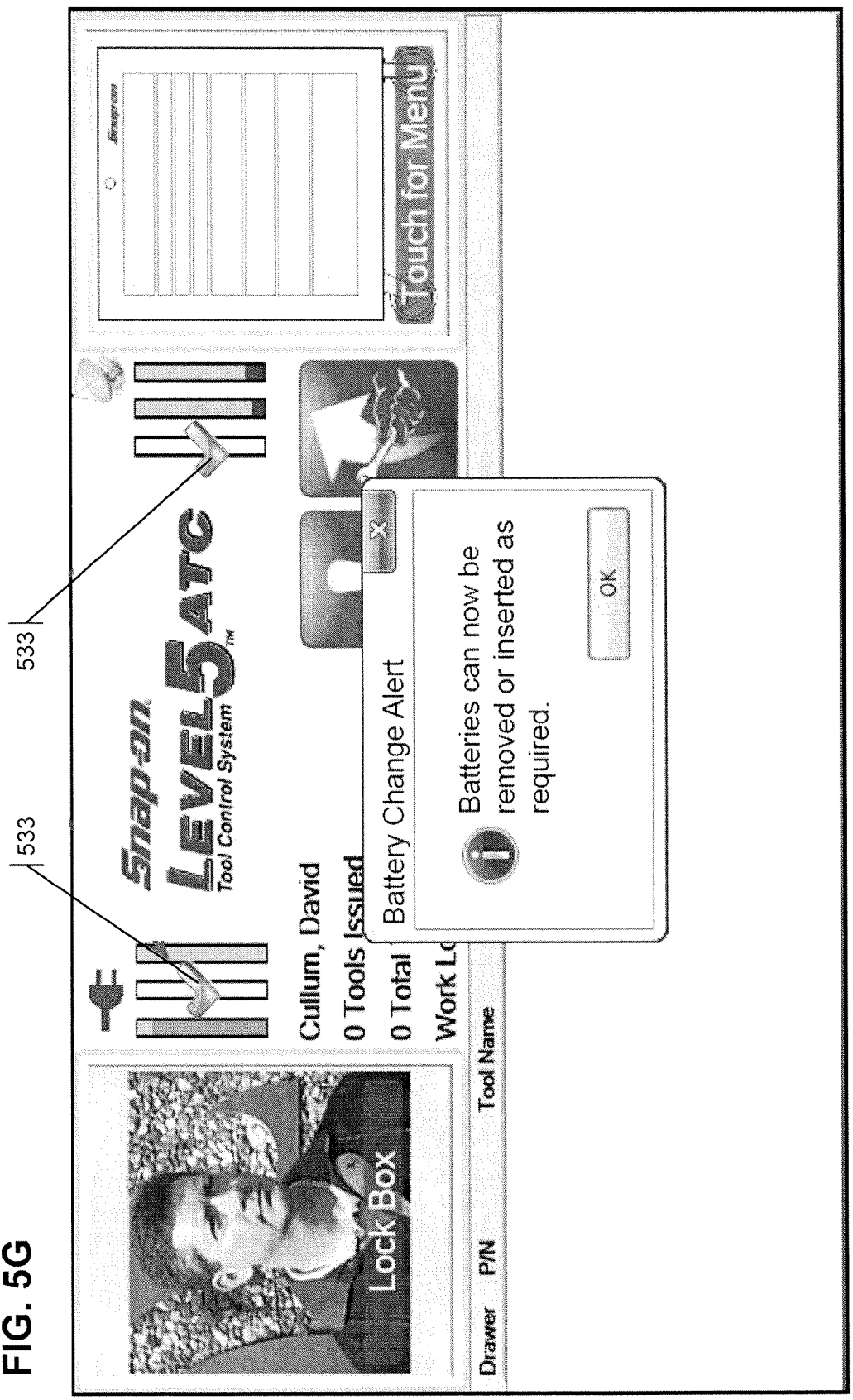

FIG. 5G is a screen-shot of a display screen shown on a display screen 205 of an inventory control device 101 during operation. The screen-shot can be displayed in a situation in which two battery packs are ready for removal and replacement from an inventory control device 101. As shown at 533, two battery packs that are ready for removal and replacement are identified by check-mark icons. A pop-up screen notifies a user that the device 101 is ready for the removal of the identified battery packs and placement of replacement battery packs into the same battery mounting slots.

Figure 5H:
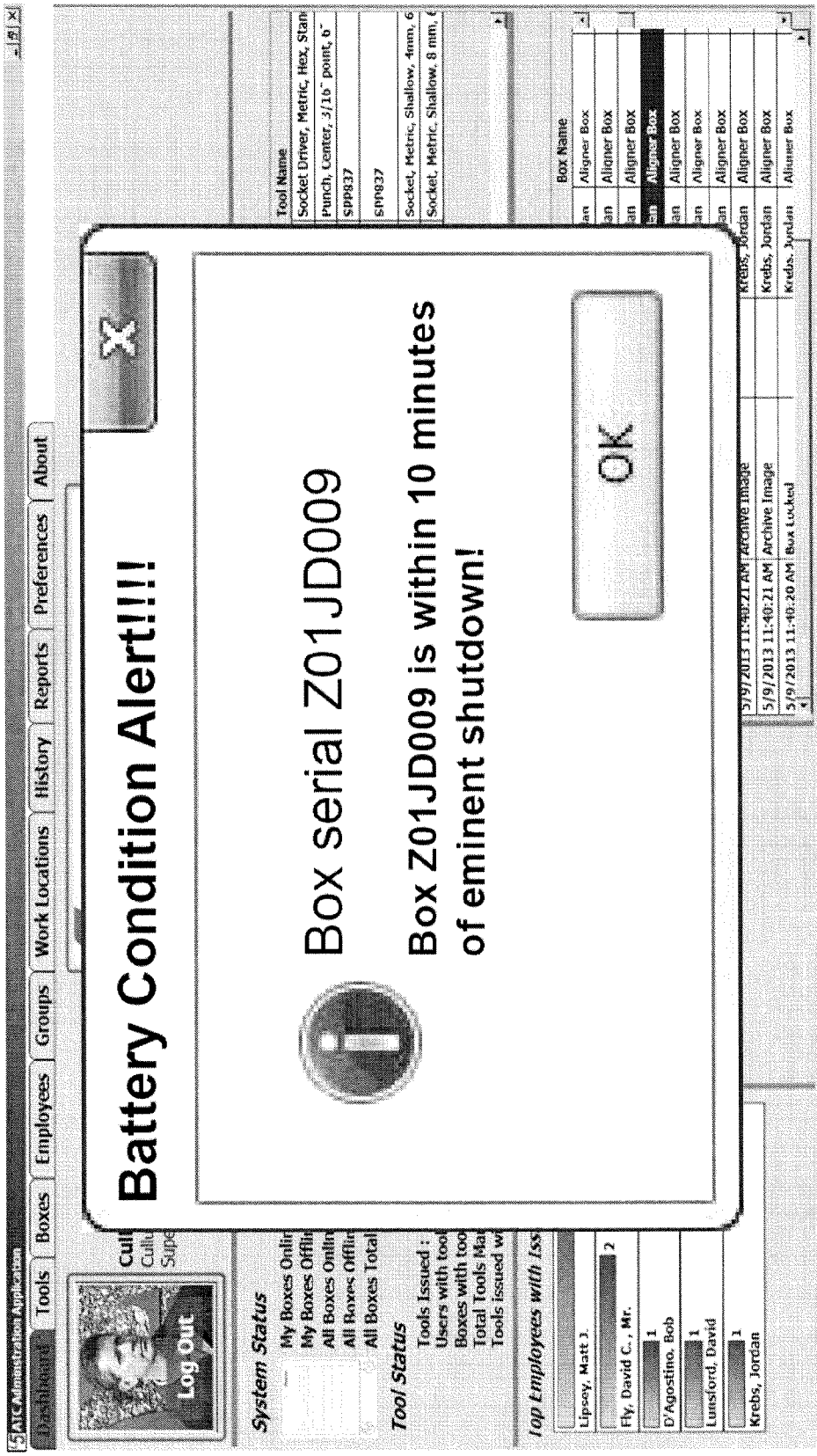
Figure 5I:
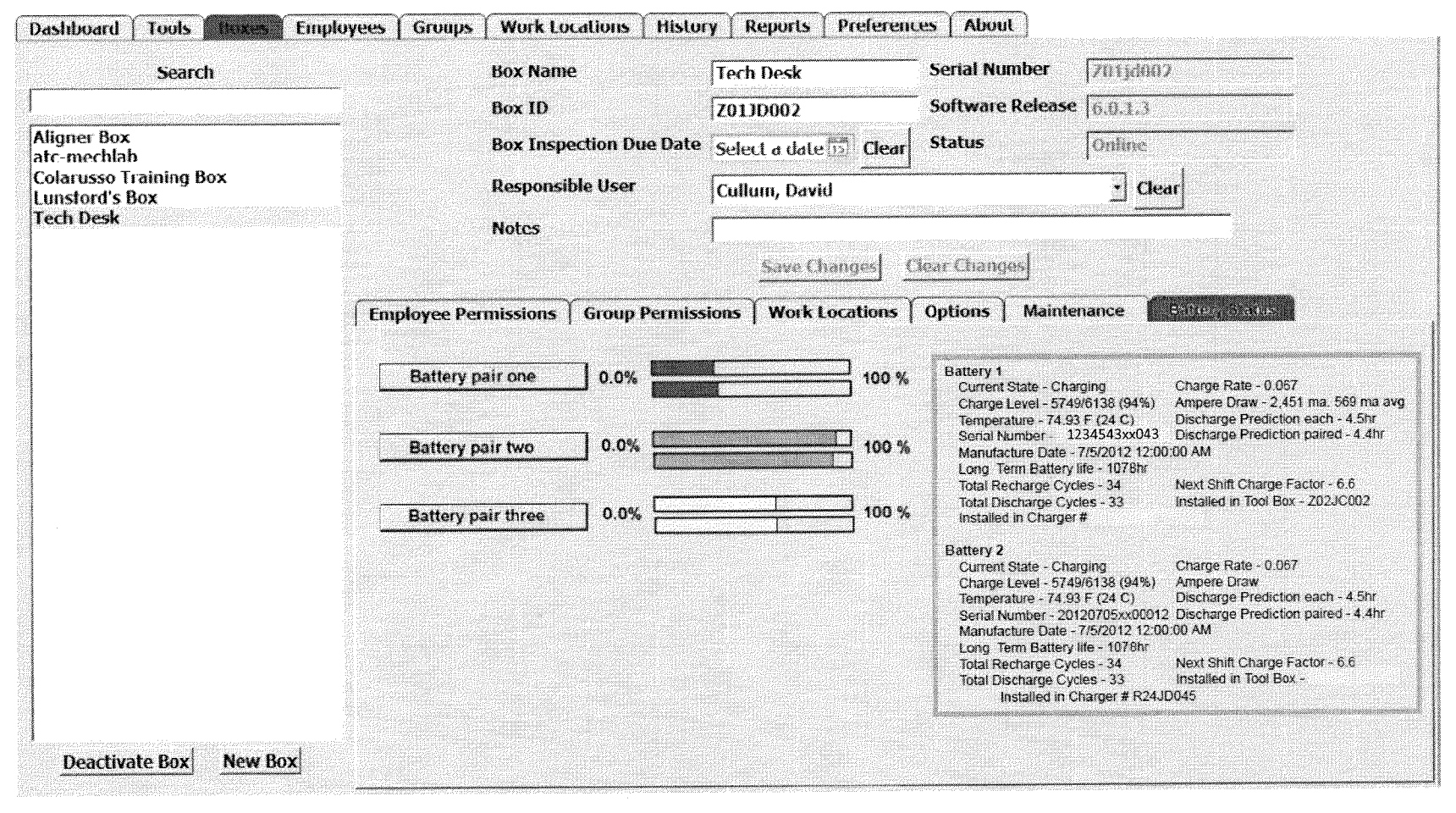

FIG. 5H is a screen-shot of a display screen shown on a display screen of a computer terminal 107 associated with the inventory control server 105. The screen-shot shows a pop-up notification that may be provided in advance of a device power-down operation resulting from an inventory control device 101 having depleted all battery packs currently mounted therein.

As shown by the above discussion, functions relating to monitoring of battery pack performance in a networked inventory control system may be implemented on computers connected for data communication via the components of a communication network, including computers operating as inventory control devices, charging stations, and/or an inventory control server as shown in FIG. 1. Although special purpose devices may be used, such devices also may be implemented using one or more hardware platforms intended to represent a general class of data processing device commonly used to run "client" and "server" programming so as to implement the battery pack monitoring functions discussed above, albeit with an appropriate network connection for data communication.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for maintaining the log of battery pack historical performance information. The software code is executable by the general-purpose computer that functions as the inventory control server and/or that functions as an inventory control terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for battery pack monitoring, in essentially the manner performed in the implementations discussed and illustrated herein.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of battery pack monitoring outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of the computer that will be the inventory control server or an inventory control device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An inventory control device comprising:
 a plurality of storage locations configured to store inventory items;
 a processor and sensing device configured to determine the presence or absence of inventory items in the plurality of storage locations;
 a power source comprising at least one battery pack operative to provide electrical power to the processor and the sensing device; and
 a power source controller configured to control the power source to provide the electrical power to the processor and the sensing device,
 wherein the power source controller is configured to perform functions to:
  retrieve, from each of the at least one battery pack, an identifier uniquely identifying the battery pack;
  monitor the operation of each of the at least one battery pack; and
  store in memory data indicative of the monitored operation of each of the at least one battery pack in association with the retrieved unique identifier for the battery pack.

2. The device of claim 1, wherein the at least one battery pack includes rechargeable batteries.

3. The device of claim 1, wherein the power source controller is configured to perform functions to:
 determine a remaining electrical power level in each of the at least one battery packs;
 determine that the remaining electrical power levels of each of the at least one battery pack does not exceed a minimum remaining electrical power level threshold; and
 cause the inventory control device to shut down upon determining that the remaining electrical power level of each of the at least one battery pack does not exceed the minimum remaining electrical power level threshold.

4. The device of claim 1, further comprising:
 a battery lock configured to prevent removal of the at least one battery pack when the battery lock is engaged; and
 an access control device configured to control the battery lock to engage or dis-engage the battery lock based on battery lock commands received from at least one of the power source controller and the processor.

5. The device of claim 1, wherein the power source controller is further configured to:
 maintain a database of historical battery pack information storing, for each retrieved battery pack identifier, the data indicative of the monitored operation of the battery pack in association with the unique identifier for the battery pack; and
 compute, based on the historical battery pack information associated with an identifier for a particular battery pack, a predicted remaining discharge time for the particular battery pack.

6. The device of claim 1, wherein the at least one battery pack is a battery pack that is non-removably mounted in the power source, and
 wherein the at least one battery pack stores sufficient electrical power to perform an orderly shutdown of the inventory control device when no other source of electrical power is available to the inventory control device.

7. The device of claim 1, wherein the power source controller is configured to monitor the operation of each of the at least one battery pack while the at least one battery pack provides electrical power to the processor and the sensing device.

8. The device of claim 1, further comprising:
 a display screen configured to display information to a user of the inventory control device,
 wherein the processor of the inventory control device is configured to perform functions to:
  receive, from the power source controller, the data indicative of the monitored operation of each of the at least one battery pack; and generate, for display on the display screen based on the data received from the power source controller, information on the operation of the at least one battery pack.

9. The device of claim 8, wherein the processor of the inventory control device generates, for display on the display screen based on the data received from the power source controller, battery pack status alerts.

10. The device of claim 8, further comprising:
a user input interface for receiving input from the user of the inventory control device,
wherein the processor of the inventory control device is configured to perform functions to:
receive, from the user input interface, a user selection for changing a battery pack that is currently providing the electrical power to the processor and the sensing device; and
control the power source controller to cause the power source controller to change the battery pack that is currently providing the electrical power to the processor and the sensing device in accordance with the received user selection.

11. The device of claim 1, further comprising:
a network communication interface configured for data communication across a communication interwork,
wherein the processor of the inventory control device is configured to perform functions to:
receive, from the power source controller, the data indicative of the monitored operation of each of the at least one battery pack; and
transmit, across the communication network via the network communication interface, the received data indicative of the monitored operation of the at least one battery pack.

12. The device of claim 11, wherein the processor of the inventory control device is configured to perform functions to:
receive, from the communication network via the network communication interface, a command for changing a battery pack that is currently providing the electrical power to the processor and the sensing device; and
control the power source controller to cause the power source controller to change the battery pack that is currently providing the electrical power to the processor and the sensing device in accordance with the command received from the communication network.

13. The device of claim 1, wherein the power source comprises a plurality of battery packs, and the power source controller is configured to perform functions to:
control the power source to cause the power source to provide the electrical power to the processor and the sensing device from only one or more selected battery packs of the plurality of battery packs.

14. The device of claim 13, wherein the power source controller is configured to perform functions to:
determine a remaining electrical power level in each of the plurality of battery packs;
identify, among the plurality of battery packs, one or more battery packs having remaining electrical power levels that exceed a minimum remaining electrical power level threshold; and
provide the electrical power to the processor and the sensing device from one battery pack of the plurality of battery packs that is determined to have the lowest remaining electrical power level among the battery packs identified as having remaining electrical power levels exceeding the minimum remaining electrical power level threshold.

15. The device of claim 14, wherein the power source controller is further configured to perform functions to:
monitor the remaining electrical power level of the one battery pack while the one battery pack provides the electrical power to the processor and the sensing device; and
upon determining that the remaining electrical power level of the one battery pack has fallen below the minimum remaining electrical power level threshold, identify one or more other battery packs having remaining electrical power levels that exceed the minimum remaining electrical power level threshold; and
provide the electrical power to the processor and the sensing device from a battery pack that is determined to have the lowest remaining electrical power level among the one or more other battery packs identified as having remaining electrical power levels exceeding the minimum remaining electrical power level threshold.

16. An electronic inventory control system comprising:
a data communication network;
a plurality of inventory control devices communicatively connected to the data communication network, each inventory control device comprising a plurality of storage locations configured to store inventory items, a processor and sensing device configured to determine the presence or absence of inventory items in the plurality of storage locations, a power source comprising at least one battery pack operative to provide electrical power to the processor and the sensing device, and a network communication interface for communicating across the data communication network; and
an inventory control server communicatively connected to the data communication network to communicate with each of the plurality of inventory control devices,
wherein the inventory control server is configured to perform functions to:
receive, via the data communication network from each of the inventory control devices, battery pack information including data indicative of monitored operation of a battery pack in the inventory control device in association with an identifier uniquely identifying the battery pack.

17. The system of claim 16, wherein the inventory control server is further configured to:
generate, based on the battery pack information received from each of the inventory control devices, a battery pack status alert identifying a battery pack that is a subject of the alert and identifying an inventory control device of the plurality of inventory control devices including the battery pack that is the subject of the alert; and
cause the battery pack status alert to be issued in the form of at least one of a display on a computer terminal of the inventory control server and an alert issued in the form of a messaging service message or an email message.

18. The system of claim 16, wherein the inventory control server is configured to generate and transmit, to a particular inventory control device across the data communication network, a command for causing the power source of the particular inventory control device to change a battery pack that is currently providing the electrical power to the processor and the sensing device of the inventory control device.

19. The system of claim 16, wherein the inventory control server is configured to receive battery pack information of a battery pack that includes data indicative of monitored operation of the battery pack while the battery pack provides electrical power to the processor and the sensing device.

20. The system of claim 16, wherein:
the inventory control server stores, in a database of historical battery pack information, the received battery pack information including the data indicative of the monitored operation of a battery pack in association with an identifier uniquely identifying the battery pack, and
the inventory control server is configured to compute, based on the historical battery pack information stored in the database and associated with a particular battery pack identifier, a predicted remaining discharge time for the battery pack identified by the particular battery pack identifier.

21. The system of claim 20, wherein the inventory control server is further configured to compute, based on the historical battery pack information stored in the database and associated with the particular battery pack identifier, a battery lifetime or replacement date for the battery pack identified by the particular battery pack identifier.

22. The system of claim 16, further comprising:
a battery pack charger communicatively connected to the data communication network, wherein the inventory control server is configured to perform functions to:
receive, via the data communication network from the battery pack charger, battery pack information including data indicative of monitored charging operation of a battery pack in the battery pack charger in association with an identifier uniquely identifying the battery pack; and
determine, based on the battery pack information received from the plurality of inventory control devices and from the battery pack charger, the location and remaining electrical power levels of the battery packs.

23. The system of claim 22, wherein the inventory control server is configured to perform functions to compute, based on the battery pack information received from each of the inventory control devices and from the battery pack charger, a predicted remaining electrical power level of each battery pack at a predetermined future time.

* * * * *